US009821586B2

(12) United States Patent
Steenackers

(10) Patent No.: US 9,821,586 B2
(45) Date of Patent: Nov. 21, 2017

(54) IR DYES AND LASER MARKABLE ARTICLES COMPRISING SUCH IR DYES

(71) Applicant: AGFA-GEVAERT, Mortsel (BE)

(72) Inventor: Marin Steenackers, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 15/304,307

(22) PCT Filed: Apr. 27, 2015

(86) PCT No.: PCT/EP2015/059089
§ 371 (c)(1),
(2) Date: Oct. 14, 2016

(87) PCT Pub. No.: WO2015/165854
PCT Pub. Date: Nov. 5, 2015

(65) Prior Publication Data
US 2017/0043602 A1      Feb. 16, 2017

(30) Foreign Application Priority Data

Apr. 30, 2014     (EP) ..................................... 14166498

(51) Int. Cl.
*B41M 3/14*      (2006.01)
*B41M 5/26*      (2006.01)
(Continued)

(52) U.S. Cl.
CPC .............. *B41M 5/34* (2013.01); *B41M 3/142* (2013.01); *B41M 5/267* (2013.01); *B41M 5/30* (2013.01); *B42D 25/00* (2014.10); *C09B 23/0016* (2013.01); *C09B 23/0033* (2013.01); *C09B 23/0041* (2013.01); *C09B 23/0066* (2013.01); *C09B 23/086* (2013.01); *C09B 23/164* (2013.01); *B41M 2205/04* (2013.01); *B41M 2205/38* (2013.01); *B41M 2205/42* (2013.01)

(58) Field of Classification Search
CPC .......... B41M 3/14; B41M 3/142; B41M 5/26; B41M 5/267; B41M 5/34; B41M 2205/04; B41M 2205/38; B41M 2205/42; B42D 25/00; C09B 23/0016; C09B 23/0041; C09B 23/0066; C09B 23/08; C09B 23/086; C09B 23/164; G11B 7/246; G11B 7/247; G11B 7/2472
USPC ........................................................ 503/201
See application file for complete search history.

(56) References Cited

U.S. PATENT DOCUMENTS

| 4,720,449 | A  | 1/1988 | Borror et al. |
| 7,935,473 | B2 | 5/2011 | Iwai |

(Continued)

FOREIGN PATENT DOCUMENTS

| DE | 199 57 001 A1 | 5/2001 |
| DE | 10 2008 013 312 A1 | 10/2008 |

(Continued)

OTHER PUBLICATIONS

Official Communication issued in International Patent Application No. PCT/EP2015/059089, dated Jul. 1, 2015.

*Primary Examiner* — Bruce H Hess
(74) *Attorney, Agent, or Firm* — Keating and Bennett, LLP

(57) ABSTRACT

Infrared dyes having an infrared absorption maximum above 1130 nm with minor colouration in the visual spectrum. The infrared dyes are especially useful for producing multicolour laser marked security documents having reduced background coloration and enhanced colour gamut.

15 Claims, 1 Drawing Sheet

(51) Int. Cl.
  *B41M 5/34* (2006.01)
  *B42D 25/00* (2014.01)
  *G11B 7/2472* (2013.01)
  *B41M 5/30* (2006.01)
  *C09B 23/01* (2006.01)
  *C09B 23/08* (2006.01)
  *C09B 23/16* (2006.01)

(56) References Cited

U.S. PATENT DOCUMENTS

2004/0115404 A1    6/2004   Tsuboi et al.
2007/0072119 A1    3/2007   Iwai et al.
2012/0119171 A1    5/2012   Ohashi et al.

FOREIGN PATENT DOCUMENTS

| | | |
|---|---|---|
| EP | 2 181 858 A1 | 5/2010 |
| EP | 2 567 825 A1 | 3/2013 |
| EP | 2 722 367 A1 | 4/2014 |
| JP | 2002-023360 A | 1/2002 |

IR DYES AND LASER MARKABLE ARTICLES COMPRISING SUCH IR DYES

CROSS REFERENCE TO RELATED APPLICATIONS

This application is a 371 National Stage Application of PCT/EP2015/059089, filed Apr. 27, 2015. This application claims the benefit of European Application No. 14166498.7, filed Apr. 30, 2014, which is incorporated by reference herein in its entirety.

BACKGROUND OF THE INVENTION

1. Field of the Invention

This invention relates to infrared dyes, to articles, in particular security documents, comprising such infrared dyes and to laser marking of articles containing these infrared dyes.

2. Description of the Related Art

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body. A principal objective of such security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

Well known in the field of laser markable security documents is the use of laser markable polymeric supports. Laser marking produces a colour change from white to black in a laser markable support through carbonization of the polymer, usually polycarbonate as disclosed in e.g. EP-A 2181858 (AGFA GEVAERT).

During the past last years, there is an increased interest of using laser markable layers. The advantage of using a laser markable layer coated on a support instead of a laser markable support, is that a support can be used which has better physical properties than the laser markable supports, such as for example a higher flexibility than a polycarbonate support as disclosed in e.g. EP-A 2567825 (AGFA GEVAERT).

There is also an increased interest in using laser marking to produce coloured images in a security document. Therefore, laser markable layers are used which are composed of colour forming compounds (also called "leuco-dyes") which can change from essentially colourless or pale-coloured to coloured when exposed to for example heat. Typically such a laser markable layer also contains an IR dye which absorbs the IR radiation and converts it into heat.

Multicolour images may be produced by using for example three different laser markable layers in one article, each laser markable layer comprising a leuco-dye generating a different colour and an IR dye having a different maximal IR radiation absorption so that each laser markable layer can be exposed separately. U.S. Pat. No. 4,720,449 (POLAROID) suggests infrared absorbers that absorb radiation at 760 nm, 820 nm and 1100 nm, and to use cyanine, merocyanine or thiopyrylium dyes that are substantially non-absorbing in the visible region of the electromagnetic spectrum so that it will not add any substantial amount of colour to $D_{min}$ areas, i.e. the highlight areas of an image. However, no examples of infrared dyes absorbing at 1100 nm are given.

In generating multicolour images with infrared lasers, so-called colour contamination or colour fogging may occur when the infrared absorption spectra overlap too much. Less overlap results in a larger achievable colour gamut. U.S. Pat. No. 4,720,449 (POLAROID) already disclosed that the infrared dyes should have absorption maxima that are at least about 60 nm apart. For a high colour gamut, it would be desirable to have larger gaps than 60 nm possible between the absorption maxima of the infrared dyes. However, there are two problems that limit the options for doing so.

A first problem is that dyes below about 830 nm tend to absorb also light in the visual spectrum from 400 to 700 nm, resulting e.g. in a white ID card have an annoying background coloration.

A second problem is that, although lasers above 1100 nm are available, infrared dyes with an absorption maximum above 1100 nm having minor or no absorption in the visual spectrum are not widely available. In the unpublished EP-A 1218814405 (filed on Nov. 10, 2012) infrared dyes are disclosed having an absorption maximum above 1100 nm. Some infrared dyes disclosed have an absorption maximum above 1150 nm.

There is still a need for infrared dyes having minor absorption in the visual spectrum and a maximum absorption above 1100 nm, so that the infrared absorption peaks of the different infrared sensitive recording layers can be spaced well apart in order to realize a multicolour laser markable article having a high colour gamut and minor background coloration.

SUMMARY OF THE INVENTION

Preferred embodiments of the invention provide an infrared dye having minor absorption in the visual spectrum and a maximum absorption above 1130 nm. Advantages and benefits are realized by the infrared dye as defined below.

Further preferred embodiments of the invention provide an imaging element, in particular a security document precursors, comprising an infrared dye as defined below.

Further advantages and preferred embodiments of the present invention will become apparent from the following description.

BRIEF DESCRIPTION OF THE DRAWINGS

In the drawings FIG. 1 and FIG. 2 the following numbering is adhered to.

11, 21=transparent polymeric support, e.g. PET-C;
12, 22=colour forming layer;
23=opaque white core support, e.g. white PETG

DETAILED DESCRIPTION OF THE PREFERRED EMBODIMENTS

Figure 1:
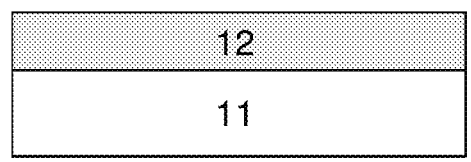
FIG. 1 shows a cross section of a preferred embodiment of a colour laser markable article according to the present invention.
Figure 2:
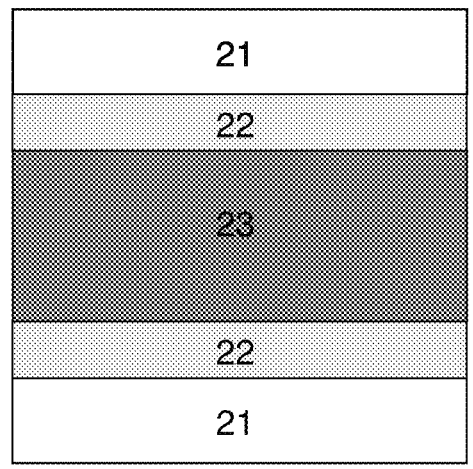
FIG. 2 shows a cross section of another preferred embodiment of a colour laser markable article according to the present invention.

The terms "polymeric support" and "foil", as used herein, mean a self-supporting polymer-based sheet, which may be associated with one or more adhesion layers e.g. subbing layers. Supports and foils are usually manufactured through extrusion.

The term "layer", as used herein, is considered not to be self-supporting and is manufactured by coating it on a (polymeric) support or foil.

The term "leuco dye" as used herein refers to compounds which change from essentially colourless to coloured when heated, with or without the presence of other reagents.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website:
http://www.consilium.europa.eu/prado/EN/glossaryPop-up.html.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl etc.

The term "alkoxy" means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

The term 'aryloxy" means "Ar—O—" wherein Ar is an optionally substituted aryl group.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term "heteroaryl group" means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl,
n-butyl, 1-isobutyl, 2-isobutyl and tertiary-butyl, acid, ester, amide, ether, thioether, ketone, aldehyde, sulfoxide, sulfone, sulfonate ester, sulphonamide, —Cl, —Br, —I, —OH, —SH, —CN, COOH and —$NO_2$.

Infrared Dye

The infrared dye according to a preferred embodiment of the present invention has a chemical structure according to Formula I

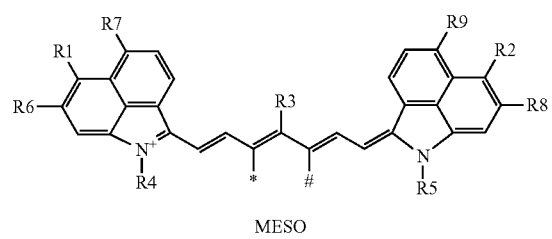

Formula I wherein MESO is selected from the group consisting of MESO-A, MESO-B and MESO-C;

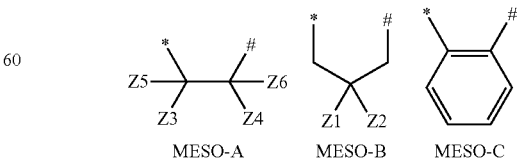

with # and * indicating the points of attachment of MESO-A, MESO-B and MESO-C in Formula I, R1 and R2 each independently represent a substituent with a Hammett constant for para substituents ($\sigma_p$) below 0.25 with the proviso that R1 and R2 are not hydrogen atoms, R3 represents a substituent with $\sigma_p$ above 0.4, R6, R7, R8 and R9 represent hydrogen, or R6 and R1 together or R7 and R1 together may represent the necessary atoms to form an optionally substituted five- or six-membered ring including an oxygen or nitrogen atom directly attached to the carbon atom carrying the R1 group, R8 and R2 together or R9 and R2 together may represent the necessary atoms to form an optionally substituted five- or six-membered ring including an oxygen or nitrogen atom directly attached to the carbon atom carrying the R2 group, R4 and R5 each independently represent an optionally substituted alkyl group, Z1, Z2, Z3, Z4, Z5 and Z6 each independently represent hydrogen, an alkyl group having 1 to 8 carbon atoms, a cyanide group, an ester group having 2 to 8 carbon atoms, an amide group having 3 to 8 carbon atoms or an aryl group having 6 to 14 carbon atoms, or Z1 and Z2 may represent the necessary atoms to form an alicyclic group having 5 to 14 carbon atoms or a heterocyclic group having 4 to 14 carbon atoms.

In a preferred embodiment, R1 and R2 each independently represent a substituent with a Hammett constant for para substituents ($\sigma_p$) below −0.1 or a halogen atom.

In a more preferred embodiment, R1 and R2 each independently represent a chlorine atom, a bromine atom, an iodine atom, an alkoxide group, a thioalkyl group, an arylamino group or an alkylamino group.

In a most preferred embodiment, R1 and R2 each independently represent a chlorine atom or an alkoxide group having 1 to 10 carbon atoms.

In a preferred embodiment, R3 represents a substituent with a Hammett constant for para substituents above 0.5.

In a more preferred embodiment, R3 represents a substituent with a Hammett constant for para substituents above 0.65.

In an even more preferred embodiment, R3 represents an optionally substituted sulfonium group, an optionally substituted ammonium group, an optionally substituted fosfonium group, an optionally substituted phosphine group, —CN, $NO_2$, —$SOCF_3$, —$N_2^+$, —$SO_2CF_3$, —$SO_2CN$, —$COCF_3$, —$C(CN)_3$, —$OSO_2CF_3$, $SCF_3$, —OCN, —SCN, —$OSO_2CF_3$, —$SO_2$—Y1 or —PY2Y3 wherein Y1, Y2 and Y3 each independently represent an optionally substituted alkyl or aryl group.

In a most preferred embodiment, R3 represents —$SO_2$—Y4 wherein Y4 represents an optionally substituted alkyl or aryl group.

In particular preferred embodiment, the MESO group is MESO-A with Z3, Z4, Z5 and Z6 representing a hydrogen atom.

The infrared dye according to Formula I preferably has an absorption maxima ($\lambda$max) ≥1130 nm, more preferably ≥1140 nm, most preferably ≥1150 nm.

The infrared red dye is preferably present in the laser markable layer in an amount of 0.01 to 1.0 g/m², more preferably in an amount of 0.02 to 0.5 g/m².

Some examples of IR dyes according to preferred embodiments of the present invention are given in the following table.

IR-01

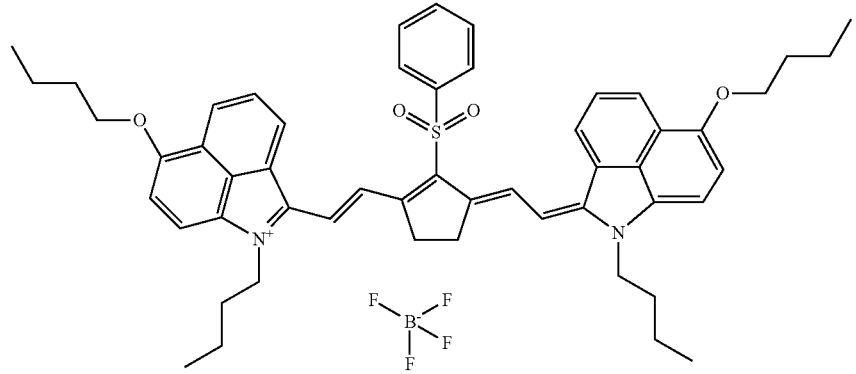 [SMILES: CCCCOc1ccc2c3c(cccc13)C(/C=C/C1=C(S(=O)(=O)c3ccccc3)C(=C/C=c3\c4cccc5c(OCCCC)ccc(c54)n3CCCC)/CC1)=[N+]2CCCC ; F[B-](F)(F)F]

IR-02

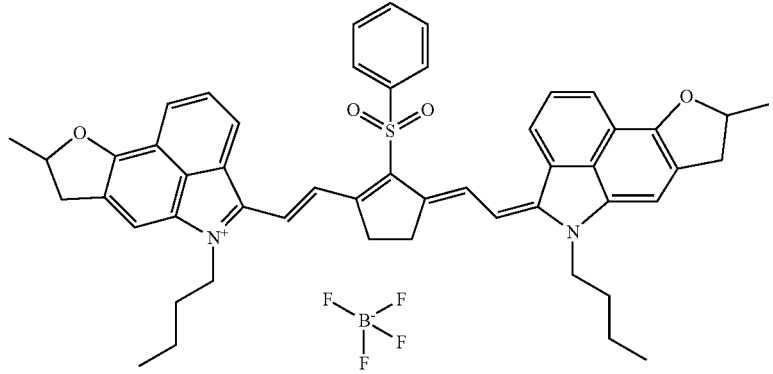

-continued
IR-03
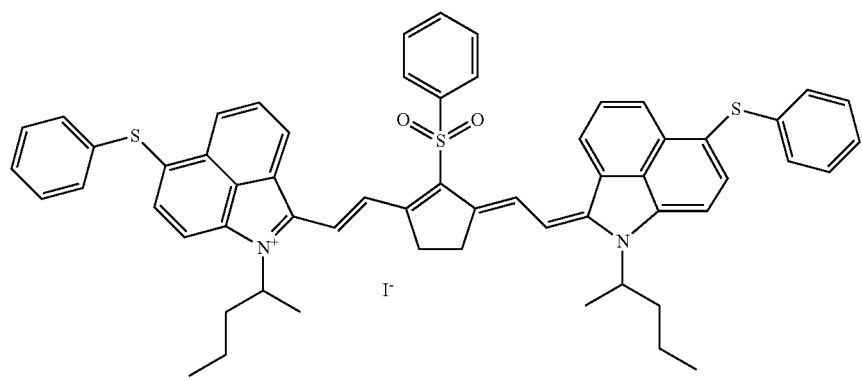 [SMILES: CCCC(C)n1/c(=C/C=C2\CCC(/C=C/C3=[N+](C(C)CCC)c4ccc(Sc5ccccc5)c5cccc3c45)=C2S(=O)(=O)c2ccccc2)c2cccc3c(Sc4ccccc4)ccc1c32 ; [I-]]
IR-04
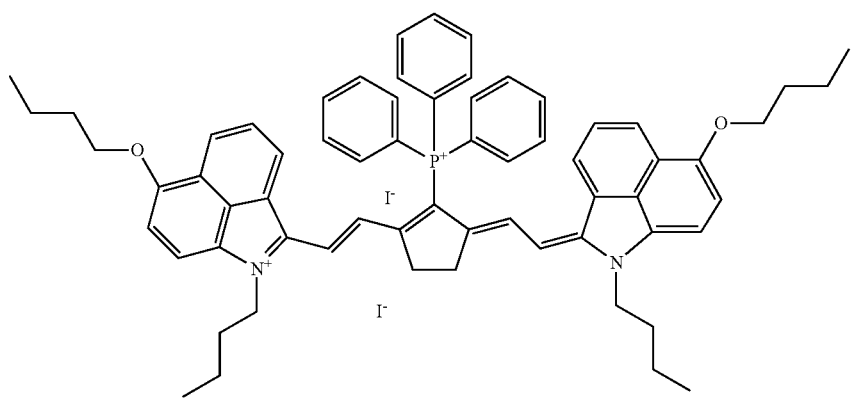 [SMILES: CCCCOc1ccc2c3c(cccc13)C(/C=C/C1=C([P+](c3ccccc3)(c3ccccc3)c3ccccc3)C(=C/C=c3\c4cccc5c(OCCCC)ccc(c54)n3CCCC)/CC1)=[N+]2CCCC ; [I-] ; [I-]]
IR-05
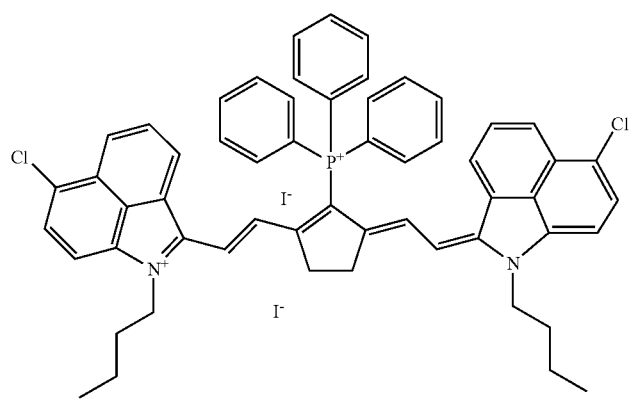 [SMILES: CCCCn1/c(=C/C=C2\CCC(/C=C/C3=[N+](CCCC)c4ccc(Cl)c5cccc3c45)=C2[P+](c2ccccc2)(c2ccccc2)c2ccccc2)c2cccc3c(Cl)ccc1c32 ; [I-] ; [I-]]
IR-06
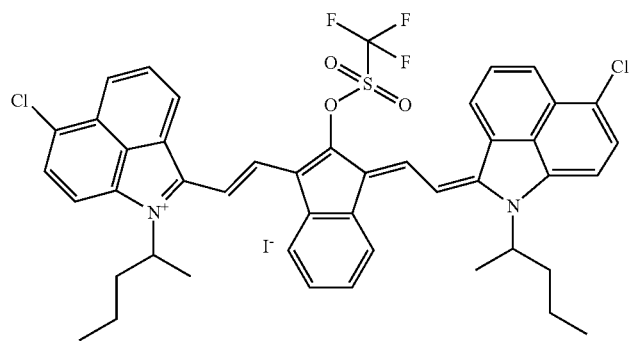 [SMILES: CCCC(C)n1/c(=C/C=C2C(OS(=O)(=O)C(F)(F)F)=C(/C=C/C3=[N+](C(C)CCC)c4ccc(Cl)c5cccc3c45)c3ccccc3/2)c2cccc3c(Cl)ccc1c32 ; [I-]]

-continued
IR-07
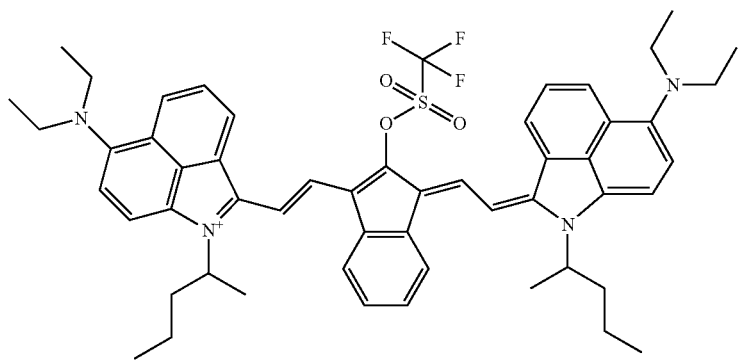 [SMILES: CCCC(C)n1/c(=C/C=C2C(OS(=O)(=O)C(F)(F)F)=C(/C=C/C3=[N+](C(C)CCC)c4ccc(N(CC)CC)c5cccc3c45)c3ccccc3/2)c2cccc3c(N(CC)CC)ccc1c32]
IR-08
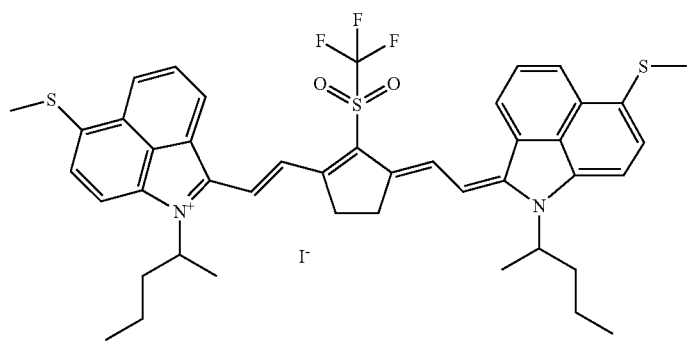
IR-09
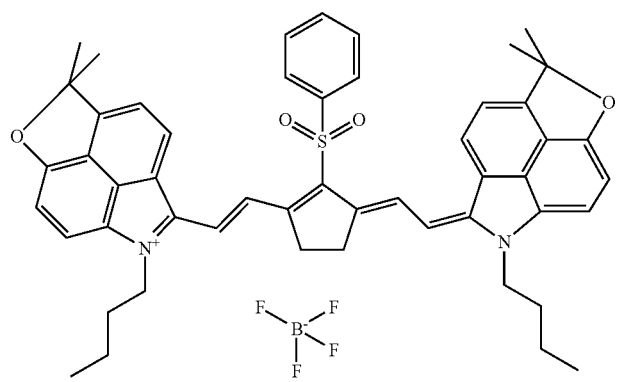 [SMILES: CCCCn1/c(=C/C=C2\CCC(/C=C/C3=[N+](CCCC)c4ccc5c6c(ccc3c46)C(C)(C)O5)=C2S(=O)(=O)c2ccccc2)c2ccc3c4c(ccc1c42)OC3(C)C ; F[B-](F)(F)F]
IR-10
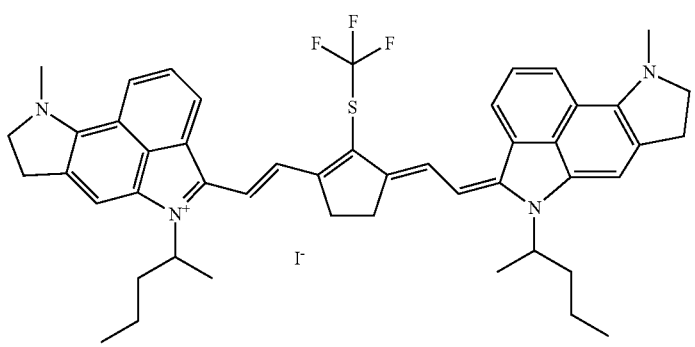 [SMILES: CCCC(C)n1/c(=C/C=C2\CCC(/C=C/C3=[N+](C(C)CCC)c4cc5c(c6cccc3c46)N(C)CC5)=C2SC(F)(F)F)c2cccc3c4c(cc1c32)CCN4C ; [I-]]

-continued
IR-11
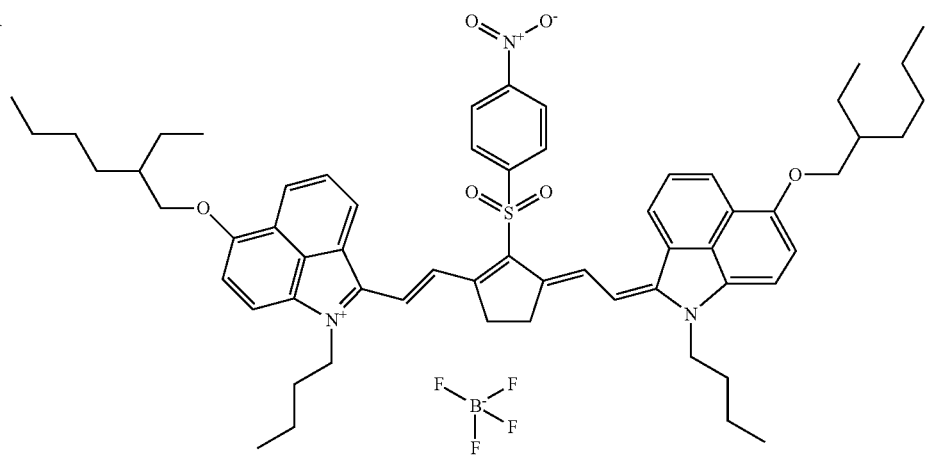
IR-12
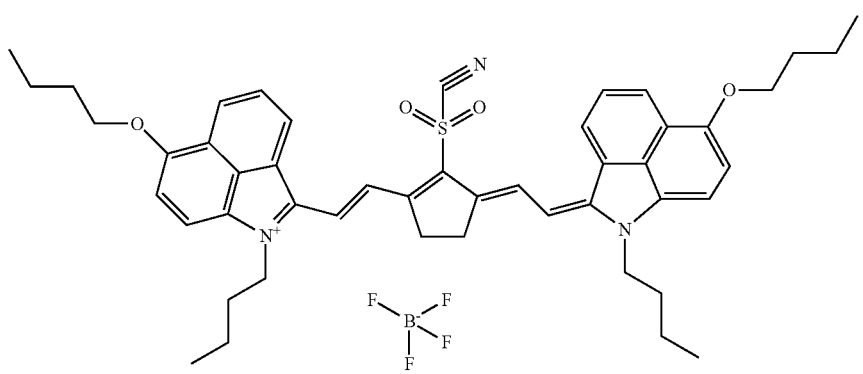 [SMILES: CCCCOc1ccc2c3c(cccc13)C(/C=C/C1=C(S(=O)(=O)C#N)C(=C/C=c3\c4cccc5c(OCCCC)ccc(c54)n3CCCC)/CC1)=[N+]2CCCC ; F[B-](F)(F)F]
IR-13
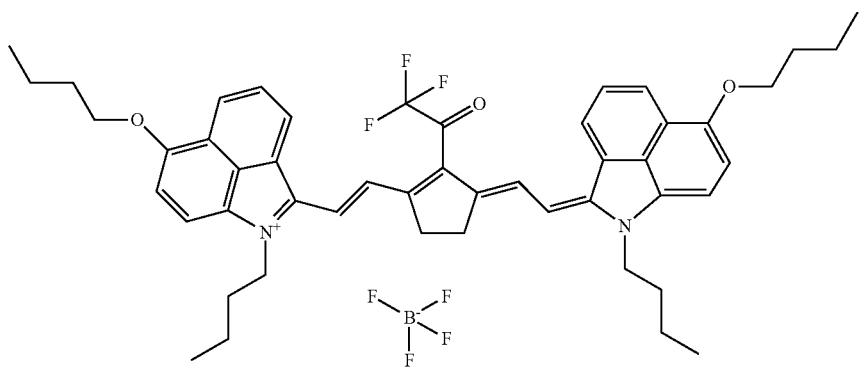 [SMILES: CCCCOc1ccc2c3c(cccc13)C(/C=C/C1=C(C(=O)C(F)(F)F)C(=C/C=c3\c4cccc5c(OCCCC)ccc(c54)n3CCCC)/CC1)=[N+]2CCCC ; F[B-](F)(F)F]
IR-14
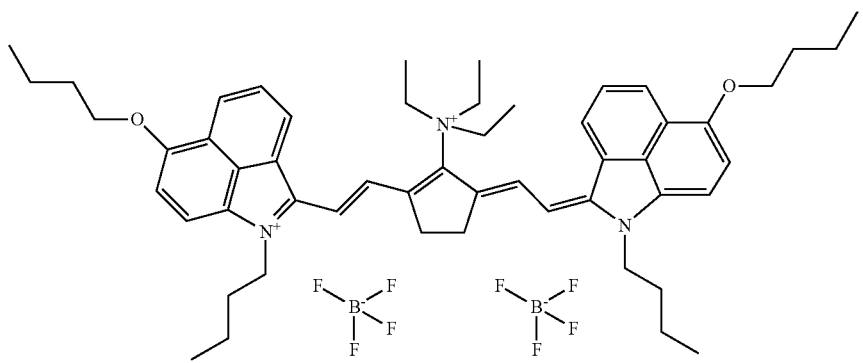 [SMILES: CCCCOc1ccc2c3c(cccc13)C(/C=C/C1=C([N+](CC)(CC)CC)C(=C/C=c3\c4cccc5c(OCCCC)ccc(c54)n3CCCC)/CC1)=[N+]2CCCC ; F[B-](F)(F)F ; F[B-](F)(F)F]

IR-15

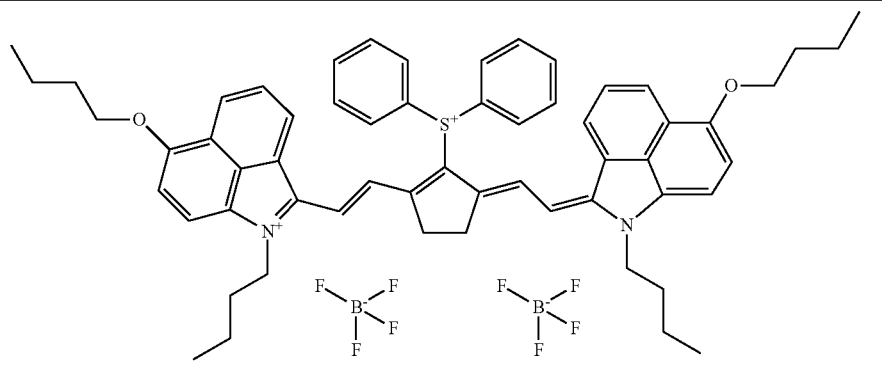

IR-16

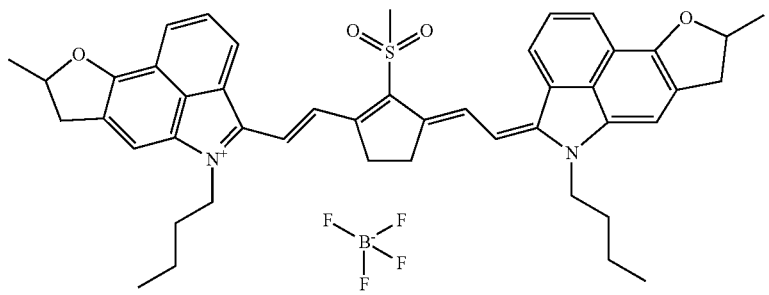

Other Infrared Dyes

Other infrared dyes may be used in combination with the infrared dyes described above.

In a colour laser markable article comprising two, three or more laser markable layers, at least one laser markable layer includes the infrared dye described above, the other laser markable layers may include other infrared dyes. The infrared dyes may differ in their wavelength of maximum absorption $\lambda_{max}$ so that they can be addressed by different infrared lasers with corresponding emission wavelengths causing colour formation only in the colour forming layer of the addressed infrared dye.

Suitable examples of infrared absorbers include, but are not limited to, quinone-diimmonium salts, aminium salts, polymethyl indoliums, metal complex IR absorbers, indocyanine green, polymethines, croconiums, cyanines, merocyanines, squaryliums, chalcogenopyryloarylidenes, metal thiolate complexes, bis(chalcogenopyrylo)polymethines, oxyindolizines, bis(aminoaryl)polymethines, indolizines, pyryliums, quinoids, quinones, phthalocyanines, naphthalocyanines, azo absorbers, (metalized) azomethines, carbon black such as acetylene black, channel black and furnace black, alkylated triphenyl phosphorothionates; oxides, hydroxides, sulfides, sulfates and phosphates of metals such as copper, bismuth, iron, nickel, tin, zinc, manganese, zirconium, tungsten, lanthanum, and antimony including lanthane hexaboride, indium tin oxide (ITO) and antimony tin oxide, titanium black and black iron oxide. Particularly preferred infrared dyes are cyanine IR dyes.

Particularly preferred infrared dyes to be combined with the infrared dyes according to the present invention are those disclosed in the unpublished EP-A EP12188143.7 (filed on Nov. 10, 2012).

Laser Markable Articles

A laser markable article according to a preferred embodiment of the present invention includes a laser markable layer, present as a self-supporting layer or as a layer on a support, the laser markable layer comprising an infrared dye as described above.

In a preferred embodiment, the laser markable layer is a colour forming layer comprising in addition to the infrared dye at least one leuco-dye. The laser markable layer may also contain a polymeric binder, an acid generating compound, and/or an acid scavenger.

A particularly preferred laser markable article includes a laser markable layer comprising an infrared dye as described above and a leuco-dye on a transparent polymeric support.

The laser markable material according to a preferred embodiment of the present invention may include three laser markable layers, a first laser markable layer containing a first infrared dye IR-1 having an absorption maximum in the infrared region $\lambda_{max}$(IR-1), a second laser markable layer containing a second infrared dye IR-2 having an absorption maximum in the infrared region $\lambda_{max}$(IR-2), and a third laser markable layer containing a third infrared dye IR-3 having an absorption maximum in the infrared region $\lambda_{max}$(IR-3), wherein each laser markable layer comprises a leuco-dye, wherein $\lambda_{max}$(IR-1)>$\lambda_{max}$(IR-2)>$\lambda_{max}$(IR-3), and wherein IR-1 is an infrared dye according to a preferred embodiment of the present invention as described above.

In a preferred laser markable article, the laser markable layer or layers as described above are provided on both sides of a core support.

The laser markable article is preferably a colour laser markable security document precursor or security document, more preferably including an electronic chip.

In a preferred embodiment, the colour laser marked document is a security document, preferably selected from the group consisting of a passport, a personal identification card and a product identification document.

The colour laser markable document preferably also contains electronic circuitry, more preferably the electronic circuitry includes a RFID chip with an antenna and/or a contact chip. The security document is preferably a "smart card", meaning an identification card incorporating an integrated circuit. In a preferred embodiment the smart card includes a radio frequency identification or RFID-chip with an antenna. Inclusion of electronic circuitry makes forgery more difficult.

The colour laser markable document preferably has a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1.

In another preferred embodiment, the colour laser markable document is a product identification document which is usually attached to the packaging material of the product or to the product itself. The product identification document not only allows to verify the authenticity of the product, but also to maintain the attractive look of a product (packaging).

Laser Markable Layer

A laser markable layer according to a preferred embodiment of the present invention can be present as a self-supporting layer or as a layer on a support. The laser markable layer comprises an infrared dye as described above and preferably also a leuco-dye. The layer may further comprise a binder, an acid generating compound, an acid scavenger, and other ingredients to further optimize its properties.

The laser markable layer can be provided onto a support by co-extrusion or any conventional coating technique, such as dip coating, knife coating, extrusion coating, spin coating, spray coating, slide hopper coating and curtain coating. Preferably the colour forming layer is coated with a slide hopper coater or a curtain coater, more preferably coated onto a transparent polymeric support including a subbing layer.

The dry thickness of the laser markable layer is preferably between 1 and 50 g/m², more preferably between 2 and 25 g/m², and most preferably between 3 and 15 g/m².

Leuco Dyes

The term "leuco dye" as used herein refers to compounds which can change from essentially colourless or pale-coloured to coloured when irradiated with UV light, IR light and/or heated. All publicly-known leuco dyes can be used and are not restricted. They are for example widely used in conventional pressure-sensitive, photosensitive or thermally-sensitive recording materials. For more information about leuco dyes, see for example "Chemistry and Applications of Leuco Dyes", Ramaiah Muthyala, Plenum Press, 1997.

A number of classes of leuco dyes may be used as colour forming compounds in a preferred embodiment of the present invention, such as for example: spiropyran leuco dyes such as spirobenzopyrans (e.g. spiroindolinobenzopyrans, spirobenzopyranobenzopyrans, 2,2-dialkylchromenes), spironaphtooxazine and spirothiopyran; leuco quinone dyes; azines such as oxazines, diazines, thiazines and phenazine; phthalide- and phthalimidine-type leuco dyes such as triarylmethane phtalides (e.g. crystal violet lactone), diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; fluoran leuco dyes such as fluoresceins, rhodamines and rhodols; triarylmethanes such as leuco crystal violet; ketazines; barbituric acid leuco dyes and thiobarbituric acid leuco dyes.

In a preferred embodiment of the present invention, leuco dyes can optionally be combined with a photosensitizing dye and/or a photoacid generator.

The colour forming compound is preferably present in the colour forming layer in an amount of 0.05 to 5.0 g/m², more preferably in an amount of 0.1 to 3.0 g/m², most preferably in an amount of 0.2 to 1.0 g/m².

The following reaction mechanisms and leuco dyes are suitable to form a coloured dye.

1. Protonation of a Leuco Dye After Fragmentation of an Acid Generator

The reaction mechanism can be represented by:

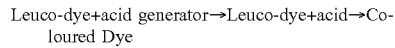

Leuco-dye+acid generator→Leuco-dye+acid→Coloured Dye

All publicly-known photo- and thermal acid generators can be used for the present invention. They can optionally be combined with a photosensitizing dye. Photo- and thermal acid generators are for example widely used in conventional photoresist material. For more information see for example "Encyclopaedia of polymer science", 4th edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred Leuco Dyes are phthalide- and phthalimidine-type leco dyes such as triarylmethane phtalides, diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; and fluoran Leuco Dyes such as fluoresceins, rhodamines and rhodols.

In a more preferred embodiment of the present invention, a combination is used of at least one compound selected from the group consisting of CASRN 50292-95-0, CASRN 89331-94-2, CASRN1552-42-7 (crystal violet lactone), CASRN148716-90-9, CASRN 630-88-6, CASRN 36889-76-7 or CASRN 132467-74-4 as the Leuco Dye and at least one compound selected from the group consisting of CASRN 58109-40-3, CASRN 300374-81-6, CASRN 1224635-68-0, CASRN 949-42-8, CASRN 69432-40-2, CASRN 3584-23-4, CASRN 74227-35-3, CASRN 953-91-3 or CASRN6542-67-2 as acid generator.

2. Oxidation of a Triarylmethane Leuco Dye

The reaction mechanism can be represented by:

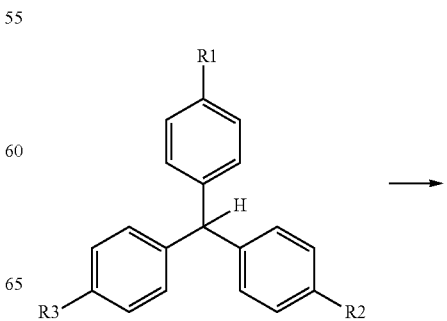

-continued

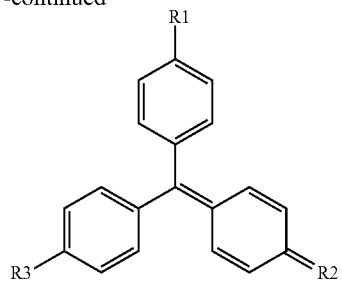

wherein R1, R2 and R3 each independently represent an amino group, an optionally substituted mono- or dialkylamino group, a hydroxyl group or an alkoxy group. R1 and R3 also each independently represent a hydrogen atom or an optionally substituted alkylene, arylene, or heteroarylene. A preferred leuco dye for the present invention is leuco crystal violet (CASRN 603-48-5).

3. Oxidation of a Leuco Quinone Dye

The reaction mechanism can be represented by

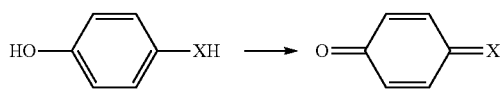

wherein X represents an oxygen atom or an optionally substituted amino or methine group.

4. Fragmentation of a Leuco Dye

The reaction mechanism can be represented by:

Leuco Dye-FG→Dye wherein FG represents a fragmenting group.

Preferred leuco dyes are oxazines, diazines, thiazines and phenazine. A particularly preferred leuco dye (CASRN104434-37-9) is shown in EP 174054 (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be catalyzed or amplified by acids, photo acid generators, and thermal acid generators.

5. Ring Opening of Spiropyran Leuco Dyes

The reaction mechanism can be represented by:

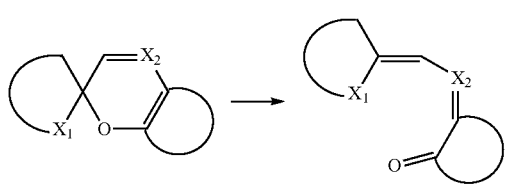

wherein $X_1$ represents an oxygen atom, an amino group, a sulphur atom or a selenium atom and $X_2$ represents an optionally substituted methine group or a nitrogen atom.

The preferred spiropyran leuco dyes in a preferred embodiment of the present invention are spiro-benzopyrans such as spiroindolinobenzopyrans, spirobenzopyranobenzopyrans, 2,2-dialkylchromenes; spironaphtooxazines and spirothiopyrans. In a particularly preferred embodiment, the spiropyran leuco dyes are CASRN 160451-52-5 or CASRN 393803-36-6. The ring opening of a spiropyran leuco dye may be catalyzed or amplified by acids, photo acid generators, and thermal acid generators.

In a preferred embodiment of a laser markable layer for producing a cyan color, the cyan color forming compound has a structure according to Formulae CCFC1, CCFC2 or CCFC3.

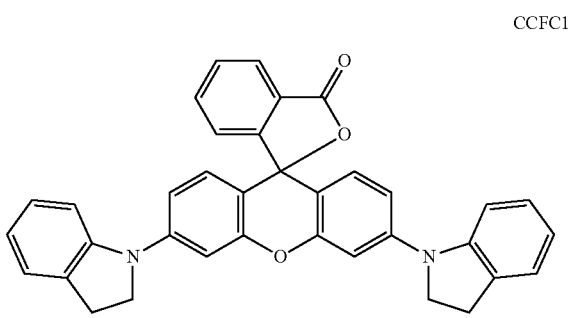

CCFC1

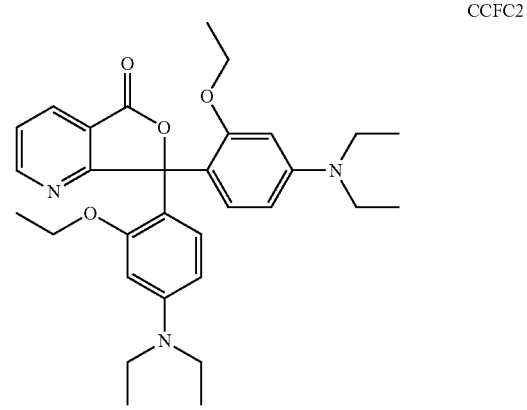

CCFC2

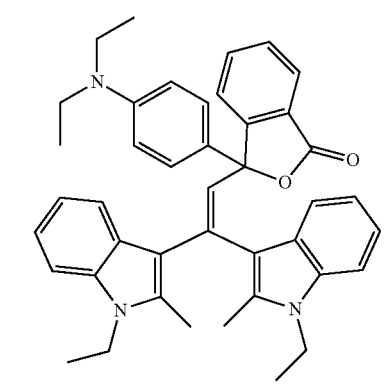

CCFC3

In a preferred embodiment of a laser markable layer for producing a magenta color, the magenta color forming compound has a structure according to Formula MCFC2:

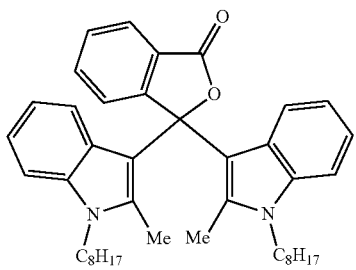

MCFC2

In a preferred embodiment of a laser markable layer for producing a red color, the red color forming compound has a structure according to Formula RCFC:

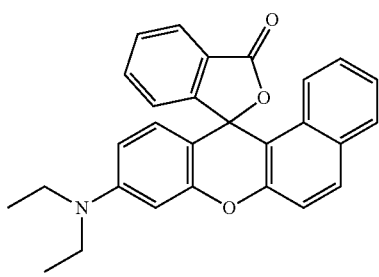

RCFC

In a preferred embodiment of a laser markable layer for producing a yellow color, the yellow color forming compound has a structure according to Formula YCFC:

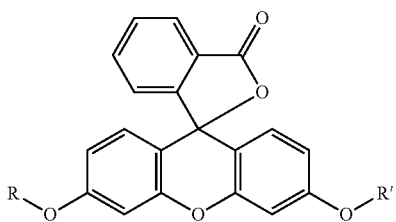

YCFC wherein R, R' are independently selected from a group consisting of a linear alkyl group, a branched alkyl group, an aryl and aralkyl group.

In one preferred embodiment, the yellow color forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow color forming compound is the compound according to Formula YCFC wherein both R and R' are methyl.

In a most preferred embodiment of a laser markable layer for producing a yellow color, the yellow color forming compound has a structure according to Formulae YCFC1 or YCFC2

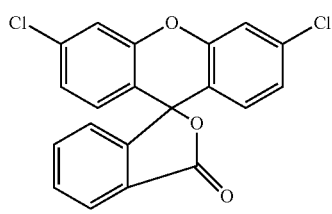

YCFC1

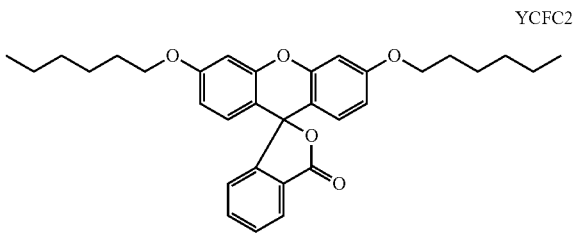

YCFC2

In a preferred embodiment of a laser markable layer for producing a black colour, the black colour forming compound has a structure according to Formula BCFC

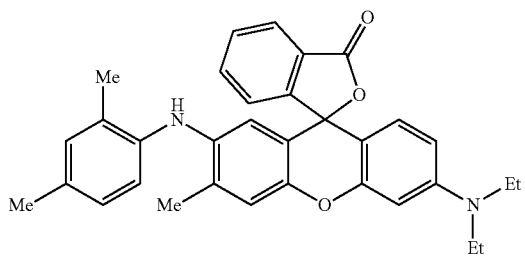

BCFC wherein Me=methyl and Et=Ethyl.

Polymeric Binders

The colour laser markable layer may include a polymeric binder. There is no real limitation on the type of polymeric binder for so far it allows colour formation. The polymer preferably includes thermoplastic polymers, heat-curable polymers, light-, UV- and electron beam-curable polymers, room temperature-curable polymers, etc. These polymers may be in the form of a resin, an elastomer, a polymer alloy, a rubber, etc. These polymers may be used alone or in combination, i.e. as a blend, copolymer or segmented copolymer. The blends include homogeneous and micro- or macro-phase segregated blends. Also the copolymers could be homogenous copolymers or microphase segregated segmented copolymers.

Examples of the thermoplastic resins may include styrene-based resins such as polystyrene, styrene/acrylonitrile copolymers, styrene/maleic anhydride copolymers, (meth)acrylic ester/styrene copolymers and ABS resins; rubber-reinforced thermoplastic resins; olefin-based resins such as polyethylene, polypropylene, ionomers, ethylene/vinyl acetate copolymers, ethylene/vinyl alcohol copolymers, ethylene/vinyl alcohol copolymer derivatives, cyclic olefin copolymers and chlorinated polyethylenes; vinyl chloride-based resins such as polyvinyl chloride, vinylacetate/vinyl chloride copolymers, ethylene/vinyl chloride copolymers and polyvinylidene chloride; acrylic resins such as (co)polymers produced by using one or more (meth)acrylic esters such as polymethyl methacrylate (PMMA); polyacrylamides or polymethacrylamides, such as N-isopropyl acrylamides, polyamide (PA)-based resins such as polyamide 6, polyamide 6,6 and polyamide 6,12; polyester-based resins such as polyethylene terephthalate (PET), polybutylene terephthalate (PBT) and polyethylene naphthalate or any copolyester such as reaction products of a diol and a dicarboxylate (e.g. hexane diol-adipic acid copolymers); polyacetal (POM) resins; polycarbonate (PC) resins; polyarylate resins; polyphenylene ethers; polyphenylene sulfides; fluorine-containing such as comprising the monomers tetrafluoroethylene, chlorotrifluoro ethylene (CTFE), vinylidene fluoride (VDF); liquid crystal polymers; imide-based resins such as polyimides, polyamide imides and polyether imides; ketone-based resins such as polyether ketones and polyether ether ketones; sulfone-based resins such as polysulfones and polyether sulfones; urethane-based resins; polyvinyl acetate; polyethyleneoxide; polyvinyl alcohol; polyvinyl alcohol derivatives; vinyl alcohol copolymers, polyvinyl ethers and copolymers; polyvinylesters and copolymers; polyvinyl acetal resins such as polyvinyl butyral; phenoxy resins; photosensitive resins; biodegradable plastics; polypropylene oxide, polyimines, polyamines, polysaccharides and polysaccharide derivatives, etc. Among these thermoplastic resins, preferred are acrylic resins, polyacetal (POM) resins and vinyl chloride copolymers resins.

Examples of the thermoplastic elastomer may include olefin-based elastomers; diene-based elastomers; styrene-based elastomers such as styrene/butadiene/styrene block copolymers; polyester-based elastomers; urethane-based elastomers; vinyl chloride-based elastomers; polyamide-based elastomers; fluororubber-based elastomers; etc.

Examples of the polymer alloy may include PA/rubber-reinforced thermoplastic resins, PC/rubber-reinforced thermoplastic resins, PBT/rubber-reinforced thermoplastic resins, PC/PMMA, etc.

Examples of the rubber may include natural rubber, isoprene rubber, butadiene rubber, styrene/butadiene rubber, acrylonitrile/butadiene rubber, chloroprene rubber, butyl rubber, ethylene/propylene rubber, acrylic rubber, urethane rubber, chlorinated polyethylene, silicone rubber, epichlorohydrin rubber, fluororubber, polysulfide rubber, etc.

Examples of the curable polymers such as heat-curable, photocurable or room temperature-curable polymers, etc., may include acrylic resins (including acrylic polymers containing an epoxy group), epoxy resins, phenol-based resins, unsaturated polyester-based resins, alkyd resins, melamine resins, urethane-based resins, including 1K or 2K PU systems, urea resins, silicone resins, polyimide resins, bismaleimide/triazine resins, furan resins, xylene resins, guanamine resins, urea formaldehyde resins, cyanate esters or polycyanurates, dicyclopentadiene resins, etc. These resins may contain a curing agent, etc., or may comprise a self-crosslinkable polymer solely.

Besides these typical thermoset polymer systems other crosslinkable systems can be used formed by reaction of reactive polymers or reaction of functional polymers with a crosslinker.

The colour forming layer preferably includes a polymeric binder comprising vinyl acetate and at least 85 wt % of vinyl chloride based on the total weight of the binder.

In one preferred embodiment, the colour laser markable laminate contains an outer layer including a polymeric binder comprising vinyl acetate and at least 50 wt % of vinyl chloride based on the total weight of the binder. An advantage of the outer layer is that it is suitable as a receiver layer for dyes applied by thermal dye sublimation or even inkjet printing.

The polymeric binder in the colour forming layer and/or the outer layer is preferably a copolymer including at least 50 wt % of a vinyl chloride and 1 wt % to 50 wt % of vinyl acetate, preferably a copolymer including at least 85 wt % of a vinyl chloride and 1 wt % to 15 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in preferred coating solvents, such as methyl ethyl ketone.

In a more preferred embodiment, the polymeric binder consists of vinyl chloride and vinyl acetate.

The polymeric binder is preferably present in the colour forming layer in an amount of 1 to 30 g/m², more preferably in an amount of 2 to 20 g/m², most preferably in an amount of 3 to 10 g/m².

Acid Generating Compounds

The fragmentation of a leuco dye in the colour forming layer may be catalyzed or amplified by acids and acid generating agents.

All publicly-known photo- and thermal acid generators can be used for the present invention. They can optionally be combined with a photosensitizing dye. Photo- and thermal acid generators are for example widely used in conventional photoresist material. For more information see for example "Encyclopaedia of polymer science", 4$^{th}$ edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred acid generating compounds have a structure according to Formulae I or II,

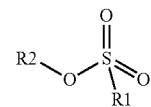

Formula I

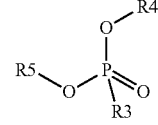

Formula II wherein

R1 and R3 independently represent an optionally substituted alkyl group, an optionally substituted (hetero)cyclic alkyl group, an optionally substituted (hetero)aryl group, an optionally substituted aralkyl group, an optionally substituted alkoxy group, an optionally substituted (hetero) cyclic alkoxy group, or an optionally substituted (hetero) aryl group.

R2, R4 and R5 independently represent an optionally substituted alkyl, an optionally substituted (hetero)cyclic alkyl group or an optionally substituted aralkyl group; R1 and R2, R4 and R5, R3 and R4, and R3 and R5 may represent the necessary atoms to form a ring.

A particular preferred acid generating compound is CASNR 953-91-3.

The acid generating agent is preferably present in the amount of 10 to 20 wt %, more preferably 14 to 16 wt % based on the total dry weight of the colour forming layer.

Acid Scavenger

The colour forming layer of the security laminate may contains one or more acid scavengers.

Acid scavengers include organic or inorganic bases. Examples of the inorganic bases include hydroxides of alkali metals or alkaline earth metals; secondary or tertiary phosphates, borates, carbonates; quinolinates and metaborates of alkali metals or alkaline earth metals; a combination of zinc hydroxide or zinc oxide and a chelating agent (e.g., sodium picolinate); hydrotalcite such as Hycite 713 from Clariant; ammonium hydroxide; hydroxides of quaternary alkylammoniums; and hydroxides of other metals. Examples of the organic bases include aliphatic amines (e.g., trialkylamines, hydroxylamines and aliphatic polyamines); aromatic amines (e.g., N-alkyl-substituted aromatic amines, N-hydroxylalkyl-substituted aromatic amines and bis[p-(dialkylamino)phenyl]-methanes), heterocyclic amines, amidines, cyclic amidines, guanidines and cyclic guanidines.

Other preferred acid scavengers are HALS compounds. Example of suitable HALS include Tinuvin™ 292, Tinuvin™ 123, Tinuvin™ 1198, Tinuvin™ 1198 L, Tinuvin™ 144, Tinuvin™ 152, Tinuvin™ 292, Tinuvin™ 292 HP, Tinuvin™ 5100, Tinuvin™ 622 SF, Tinuvin™ 770 DF, Chimassorb™ 2020 FDL, Chimassorb™ 944 LD from BASF; Hostavin 3051, Hostavin 3050, Hostavin N 30, Hostavin N321, Hostavin N 845 PP, Hostavin PR 31 from Clariant.

Further examples of acid scavengers are salts of weak organic acids such as carboxylates (e.g. calcium stearate).

A preferred acid scavenger is an organic base, more preferably an amine.

A particular preferred acid scavenger is an organic base having a pKb of less than 7.

UV Absorbers

The laser markable article may also comprise an UV-absorber. The UV-absorber may be present in a laser markable layer or may also be present in another layer, for example, an outer layer. In a preferred embodiment, the UV-absorber is present in an outer layer.

Examples of suitable UV-absorbers include 2-hydroxy-phenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™' Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from from Croda Chemicals; zinc oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

The UV-absorber may be present in a laser markable layer or may also be present in another layer, for example, an outer layer. In a preferred embodiment, the UV-absorber is present in an outer layer.

Transparent Polymeric Supports

The colour laser markable laminate preferably includes a support, more preferably a transparent polymeric support, more preferably a transparent axially stretched polyester support. The colour forming layer is coated directly on the polymeric support or on a subbing layer present on the polymeric support for improving adhesion of the colour forming layer, thereby preventing falsification through delamination.

Suitable transparent polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric support is a biaxially stretched polyethylene terephthalate foil (PET-C foil) to be very durable and resistant to scratches and chemical substances.

The support preferably is a single component extrudate, but may also be co-extrudate. Examples of suitable co-extrudates are PET/PETG and PET/PC.

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof of have been disclosed in, e.g. US 2008238086 (AGFA).

Core Supports

The colour laser markable document according to a preferred embodiment of the present invention may include a core support. The core support may be transparent or opaque. The core support is preferably an opaque white core support. The advantage of an opaque white core support is that any information present on the document is more easily readable and that a colour image is more appealing by having a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In a preferred embodiment of the present invention the rutile type is preferred because it has a very high refractive index, exhibiting a high covering power.

Subbing Layers

The polymeric support may be provided with one or more subbing layers. This has the advantage that the adhesion between the colour forming layer and the polymeric support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA) and GB1441591 (AGFA);

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m².

Coating Solvents

For coating the colour forming layer and the outer layer, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the colour forming layer, a good compromise between the fast drying of the layer(s) and the danger of fire or explosion thereby allowing high coating speeds.

Laser Marking Methods

The method for preparing a colour laser marked document according to a preferred embodiment of the present invention comprises the steps of:

a) laminating a colour laser markable article onto a core support; and b) laser marking the colour forming layer by an infrared laser.

A preferred method for preparing a laser marked article uses three infrared lasers L-1, L-2 and L-3 having respectively a laser emission wavelength of $\lambda(L\text{-}1)$, $\lambda(L\text{-}2)$ and $\lambda(L\text{-}3)$ and comprising the steps of:

laser marking with the infrared laser L-1 a first laser markable layer including an infrared dye IR-1 having an absorption maximum in the infrared region $\lambda_{max}(IR\text{-}1)$;

laser marking with the infrared laser L-2 a second laser markable layer including an infrared dye IR-2 having an absorption maximum in the infrared region $\lambda_{max}(IR\text{-}2)$;

laser marking with the infrared laser L-3 a third laser markable layer including an infrared dye IR-3 having an absorption maximum in the infrared region $\lambda_{max}(IR\text{-}3)$, wherein, the laser emission wavelengths satisfy the condition of:

$$\lambda(L\text{-}1) > \lambda(L\text{-}2) > \lambda(L\text{-}3);$$

the infrared red dye absorption maxima satisfy the condition of:

$$\lambda_{max}(IR\text{-}1) > \lambda_{max}(IR\text{-}2) > \lambda_{max}(IR\text{-}3); \text{ and}$$

wherein IR-1 is an infrared dye as described above.

In a preferred embodiment of the method, the core support is an opaque white core support. In a particular preferred embodiment of the method, the opaque white core support is a PETG support.

In a preferred embodiment of the method, the colour laser marked document is a security document.

In a preferred embodiment of the colour laser marking method, the document is laser marked through a transparent biaxially stretched polyethylene terephthalate foil (PET-C). This PET-C foil is preferably used as support for the colour forming layer.

PET-C foils, such as PETix™ from Agfa-Gevaert NV, are very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use.

PVC (polyvinylchloride) is the most widely used material for plastic cards but has low durability of the card body, resulting in an effective lifetime of only 1-3 years, much lower than the lifetime of the often expensive chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

Other Security Features

The colour laser markable laminate is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

EXAMPLES

Materials

All materials used in the following examples were readily available from standard sources such as ALDRICH CHEMICAL Co. (Belgium) and ACROS (Belgium) unless otherwise specified. The water used was deionized water.

CCE is Bayhydrol H 2558, an anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl™ 120 from Momentive Performance materials.

PEA-sol is a 10 wt % (50/50) aqueous/ethanol dispersion of PEA.

Dowfax™ 2 A1 from Pilot Chemicals C is a Alkyldiphenyloxide disulfonate (4.5% wt %).

DOW-sol is a 2.5 wt % solution of Dowfax™ 2 A1 in isopropanol.

Surfynol™ 420 from Air Products is a non ionic surfactant.

Surfynsol is a 2.5 wt % solution of Surfynol™ 420 in isopropanol.

MEK is an abbreviation used for methylethylketone.

Solvin™ 557RB is a vinylchloride-vinylacetate copolymer with 11% vinyl acetate, provided by SOLVAY.

SolvinSol is a 12.5 wt % solution of Solvin™ 557RB in MEK.

Vinnol™ H40/55 is a copolymer of 62 wt % vinyl chloride and 38 wt % of vinyl acetate provided by Wacker AG.

VinnolSol is a 12.5 wt % solution of Vinnol™ H40/55 in MEK.

HDP is the hydrogen donor-precursor CASRN 129104-70-7 prepared according to the synthesis given on page 31 of EP 605149 A (JUJO PAPER) for the compound (19).

BLD is crystal violet lactone (CASRN 1552-42-7) available from YAMADA CHEMICAL CO.

MLD is a bisindolylphthalide leuco dye (CASRN50292-95-0) available as Pergascript™ Red I6B from BASF.

YLD is 3',6'-dimethoxyfluoran (CASRN36886-76-7) available from TCI Europe NV.

CLD is a phthalide leuco dye (CASRN148716-90-9) available from MITSUI.

CORE is a 500 μm opaque PETG core available as PET-G 500 type 9311 from WOLFEN.

PETG TR is a 35 μm thick transparent PETG support available as type -PET-G transparent 35 μm from AMCOR.

S-Lec BX35Z is a polymeric binder commercially available from Sekisui.

AG is cyclohexyl p-toluenesulfonate commercially available from TCI.

HALS is Tinuvin 770 commercially available from BASF.

Tego Glide 410 is a wetting agent commercially available from Evonik

Synthesis of INT-3

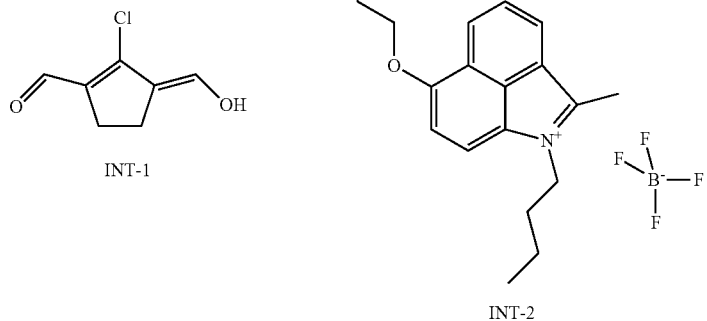

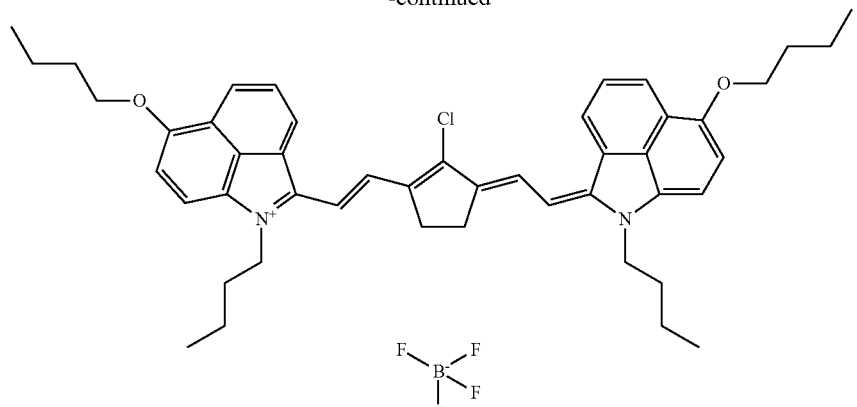

INT-3

The synthesis of intermediate INT-1 was performed as follows. 10 mol of dimethylformamide and 3 mol phosphoryl chloride were heated up to 65° C. Then 1 mol of cyclopentanon was dropped to this mixture. After one hour of stirring at 60° C., the reaction mixture was poured into 2 l water containing 7 mol sodium acetate. INT-1 was filtered and dried. The yield was 60%. The compound was analyzed using TLC-chromatography (TLC Silica gel 60 F254; supplied by Merck, eluent: methylene chloride/methanol 90/10, Rf: 0.75).

INT-2 was purchased from Spectrum Info ltd. and can be synthesized according to Ukrainskii khimicheskii zhurnal, 74, p105-113, 2008 and the references their in (Ukrainskii khimicheskii zhurnal, 73, p120-125, 2007 and US2108879).

To a stirred mixture of 3.83 g INT-2 and 0.86 g INT-1 in methanol (25 ml) at room temperature under nitrogen were added consecutively triethylamine (1 g) and acetic acid (1.8 g). The reaction was stirred for 4 hours at room temperature. The product was isolated by filtration, washed with methanol and methyl t-butyl ether. The product was dried at room temperature under reduced pressure and stored at 4° C. The compound was analyzed using TLC-chromatography (TLC Silica gel 60 F254; supplied by Merck, eluent: methylene chloride/methanol 90/10, Rf: 0.35).

Synthesis of D1

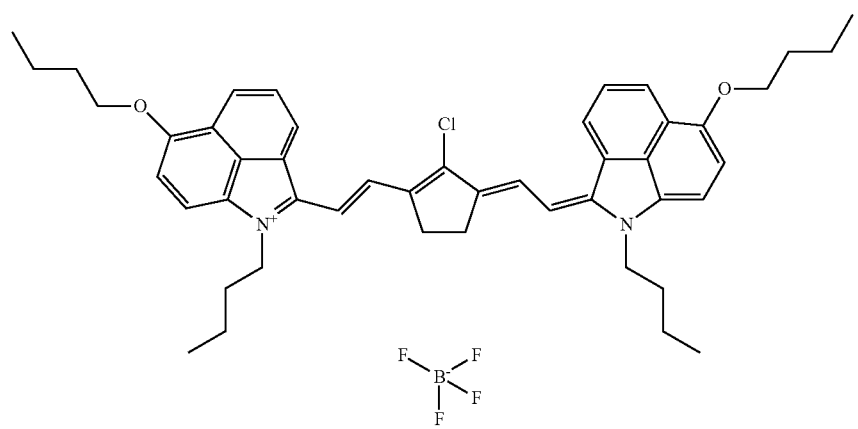

INT-3

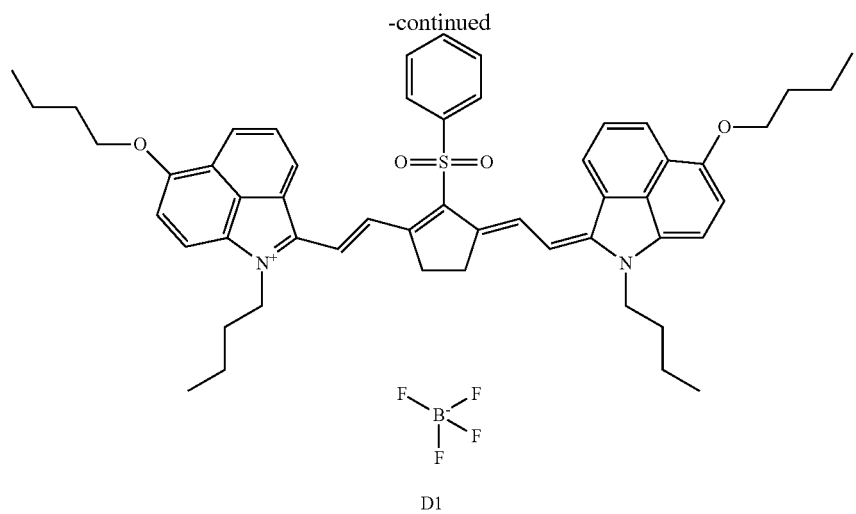

D1

To a stirred suspension of INT-3 (1.6 g) in acetone (15 ml), 0.49 g sodium benzenesulfinate (CASRN873-55-2) and 0.64 g tetrabutyl ammonium bromide was added at room temperature. The suspension was stirred for 1 hour. The product was isolated by filtration and washed with acetone, water and methyl t-butyl ether. The product was dried at room temperature under reduced pressure and stored at 4° C. The compound was analyzed using TLC-chromatography (TLC Silica gel 60 F254; supplied by Merck, eluent: methylene chloride/methanol 90/10, Rf: 0.4).

Synthesis of D3

The synthesis of intermediate INT-4 was performed as disclosed in [0157] of EP 2463109 A (AGFA). The intermediate INT-1 was prepared in the same manner as described here above.

To a stirred mixture of INT-1 containing 23% water (10.3 g; 0.05 mol) and INT-4 (36.5 g; 0.1 mol) in methanol (250 mL) was added a mixture of acetic acid (10.1 g; 0.1 mol) and triethylamine (18 g; 0.3 mol) over a 1 hour period. Stirring (under nitrogen) was continued for 1 hour at room temperature. The black precipitate was filtered and digested consecutively with 2× 20 mL of methanol and 2× 50 mL of methyl tertiary butylether (MTBE) and dried in vacuum. Yield of D3 (black powder): 27 g (74.6%). The compound was analyzed using TLC-chromatography (TLC Silica gel 60 F254; supplied by Merck, eluent: methanol/acetone 75/25, Rf: 0.4).

Synthesis of D10

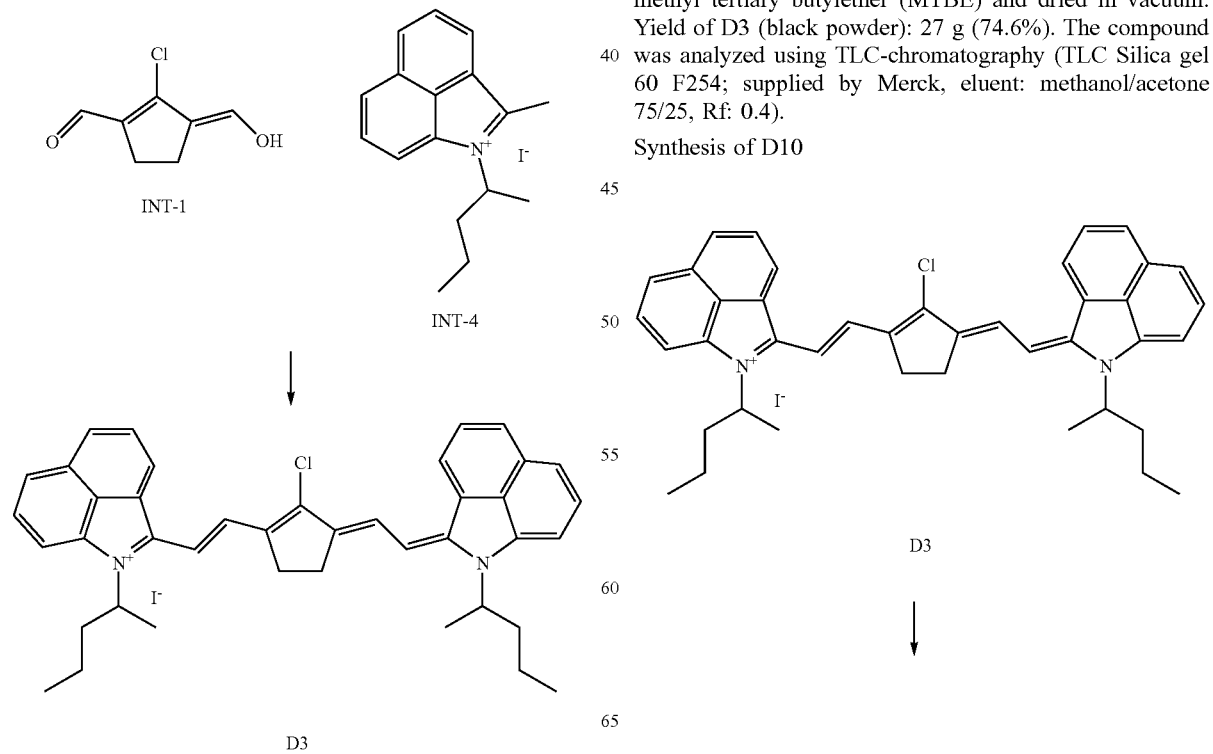

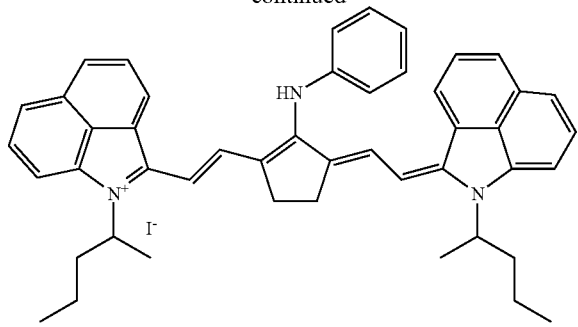

D10

7.25 g D3 was dissolved in 20 ml dimethyl sulfoxide. 7 ml aniline was added to the solution. The solution was stirred during 15 minutes at 35° C. 50 ml methanol was added to the reaction mixture. The reaction mixture was added to a mixture of 100 ml acetic acid, 100 ml water and 150 ml methanol. The mixture was stirred during 30 minutes at room temperature. The precipitate was filtered, washed with water/methanol 50/50 volume % and methyl t-butyl ether and dried in vacuum. The compound was analyzed using TLC-chromatography (TLC Silica gel 60 Partisil KC18F; supplied by Whatman, eluent: methanol/dichloromethane solution 80/20, Rf: 0.20).

Synthesis of D12

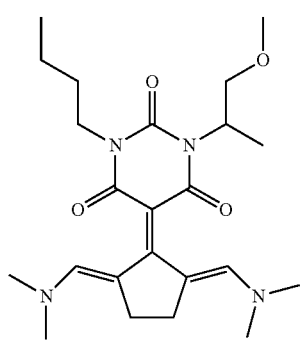

INT-5

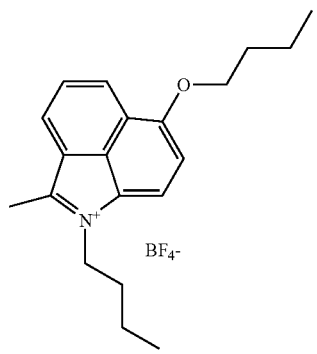

INT-2

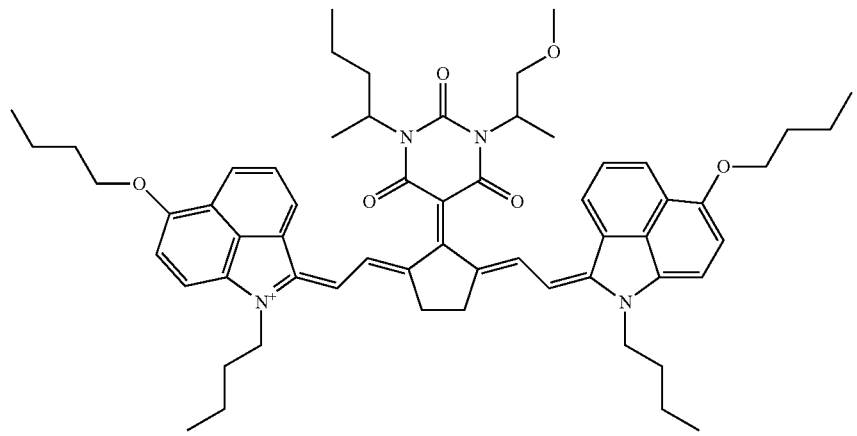

D12

INT-5 was synthesised as disclosed by paragraphs [0150] to [0155] of EP 2463109 A (AGFA). INT-2 was purchased from Spectrum Info ltd. and can be synthesized according to Ukrainskii khimicheskii zhurnal, 74, p105-113, 2008 and the references their in (Ukrainskii khimicheskii zhurnal, 73, p120-125, 2007 and US2108879).

0.862 g INT-5 and 1.68 g INT-2 were stirred in 20 ml methyl acetate under reflux for 1 hour. The reaction mixture was cooled down to room temperature. The precipitate was filtered, washed with methyl acetate and methanol and dried in vacuum. The compound was analyzed using TLC-chromatography (TLC Silica gel 60 F254; supplied by Merck, eluent: methanol, Rf: 0.1).

Synthesis of D13

D13 was synthesised as disclosed by paragraphs [0150] to [0159] of EP 2463109 A (AGFA).

Synthesis of INT-7

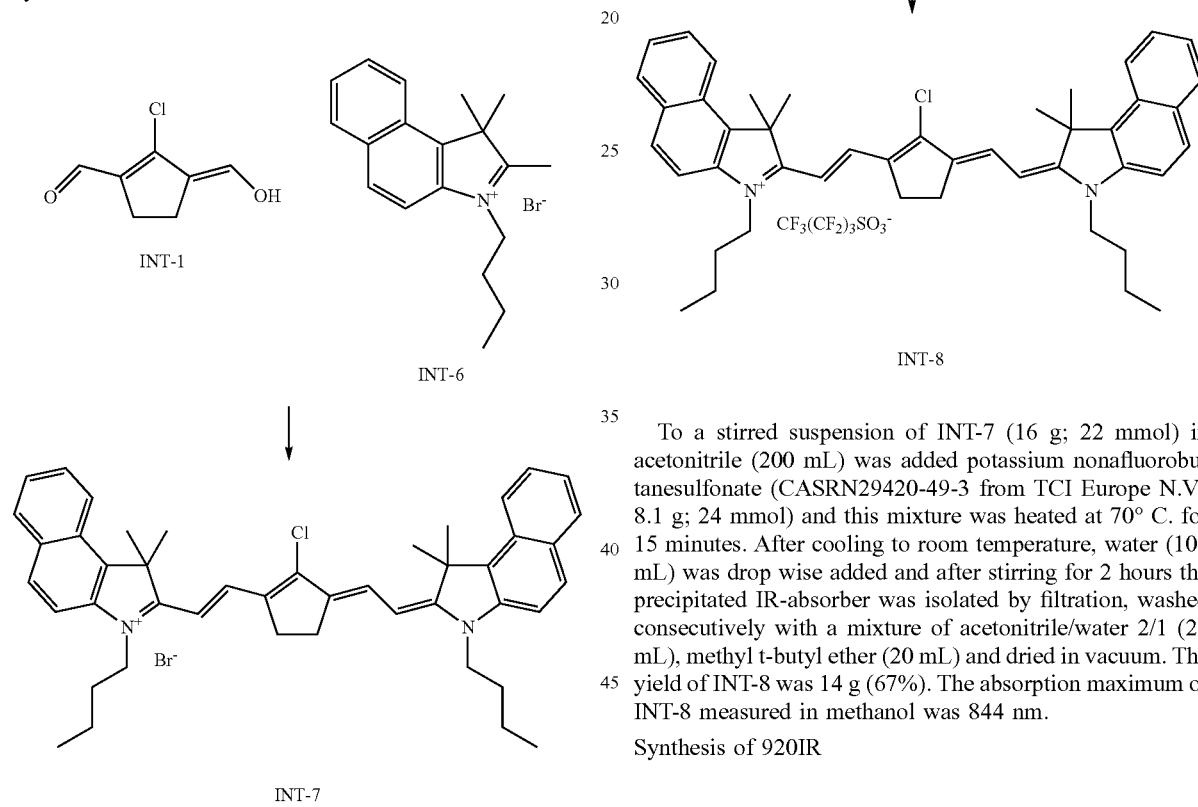

The intermediate INT-1 was prepared in the same manner as described here above. The synthesis of the intermediate INT-6 was performed as described by paragraphs [0097] and [0098] of US20040182268 A1 (AGFA). To a stirred mixture of INT-1 (4.75 g; 30 mmol) and INT-6 (20.8 g; 60 mmol) in ethanol (100 mL) at room temperature were added consecutively triethylamine (12.1 g; 120 mmol) and acetic acid anhydride (12.2 g; 120 mmol). After heating to 50° C. for 1 hour, the reaction mixture was cooled to 20° C. and isopropanol (100 mL) was added. After 1 hour the precipitated IR-absorber was isolated by filtration, washed with EtOAc (20 mL) and dried in vacuo. Yield (crude) of INT-7 was 16 g (73%). The absorption maximum of INT-7 measured in methanol was 844 nm.

Synthesis of INT-8

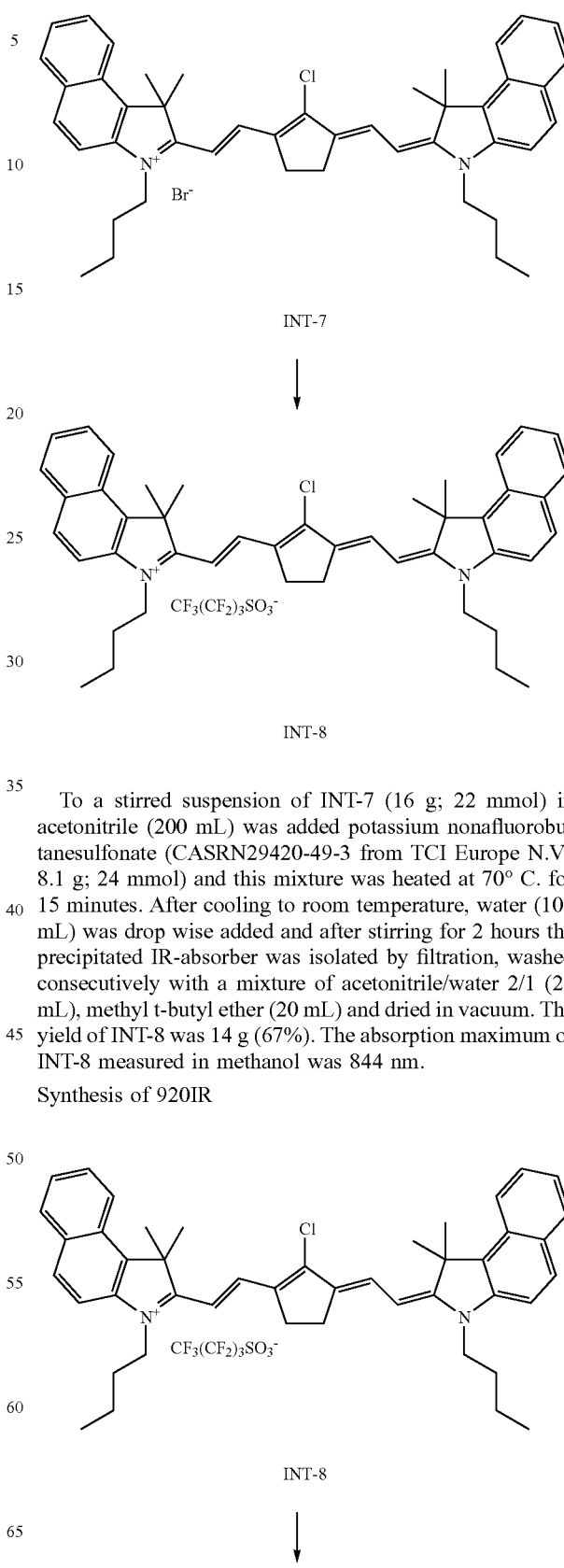

To a stirred suspension of INT-7 (16 g; 22 mmol) in acetonitrile (200 mL) was added potassium nonafluorobutanesulfonate (CASRN29420-49-3 from TCI Europe N.V.; 8.1 g; 24 mmol) and this mixture was heated at 70° C. for 15 minutes. After cooling to room temperature, water (100 mL) was drop wise added and after stirring for 2 hours the precipitated IR-absorber was isolated by filtration, washed consecutively with a mixture of acetonitrile/water 2/1 (20 mL), methyl t-butyl ether (20 mL) and dried in vacuum. The yield of INT-8 was 14 g (67%). The absorption maximum of INT-8 measured in methanol was 844 nm.

Synthesis of 920IR

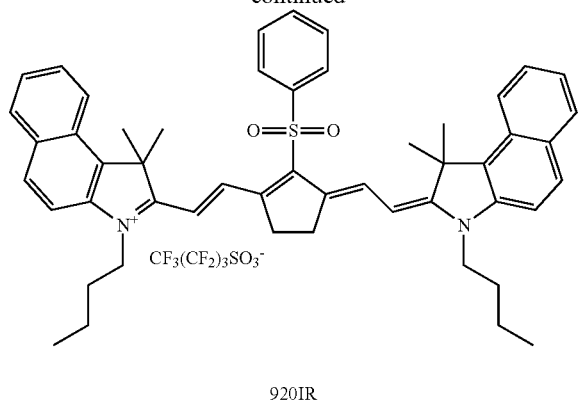

920IR

To a stirred suspension of INT-8 (1.65 g; 1.73 mmol) in methanol (15 mL) under nitrogen at room temperature is added sodium benzenesulfinate (CASRN873-55-2 from Aldrich; 0.297 g; 1.81 mmol). After stirring for 2 hours the precipitated IR-absorber was isolated by filtration, washed with MTBE (5 mL) and dried in vacuum. The yield of 920IR was 1.2 g (65%). The absorption maximum measured in methanol was 910 nm. The absorption maximum of IR-3 measured in methylenechloride including $6.5 \times 10^{-6}$ wt % of methanesulfonic acid was 923 nm.

Absorption Maxima

The absorption maxima (λmax) of some IR are given in Table 1 together with the Hammett constant for para substituents ($\sigma_p$) of R1, R2 and R3 according to Formula I.

TABLE 1

| Compound | Structure | $\lambda_{max}$ (nm) | $\sigma_p$ (R3)* | $\sigma_p$ (R1) = $\sigma_p$ (R2)* |
|---|---|---|---|---|
| D1 (INV) | | 1193*** | 0.68 | −0.32 |
| D2 (COMP) | | 1120*** | 0.68 | —H |
| D3 (COMP) | | 1062*** | 0.227 | —H |

TABLE 1-continued
| Compound | Structure | $\lambda_{max}$ (nm) | $\sigma_p$ (R3)* | $\sigma_p$ (R1) = $\sigma_p$ (R2)* |
|---|---|---|---|---|
| D4 (COMP) | 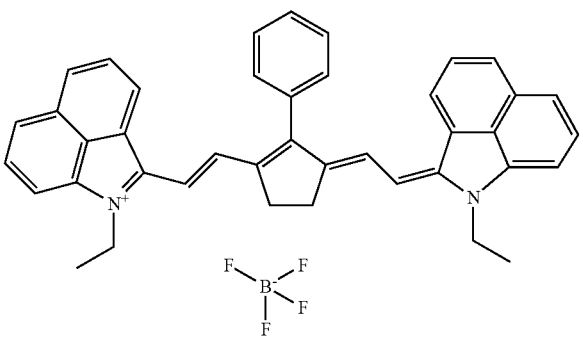 [SMILES: CCn1/c(=C/C=C2\CCC(/C=C/C3=[N+](CC)c4cccc5cccc3c45)=C2c2ccccc2)c2cccc3cccc1c32 ; F[B-](F)(F)F] | 1035** | −0.01 | —H |
| D5 (COMP) | 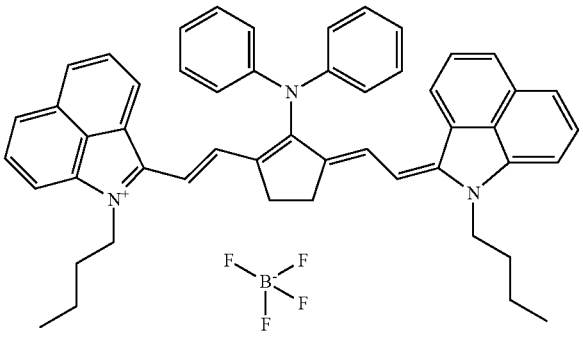 [SMILES: CCCCn1/c(=C/C=C2\CCC(/C=C/C3=[N+](CCCC)c4cccc5cccc3c45)=C2N(c2ccccc2)c2ccccc2)c2cccc3cccc1c32 ; F[B-](F)(F)F] | 1015** | −0.26 | —H |
| D6 (COMP) | 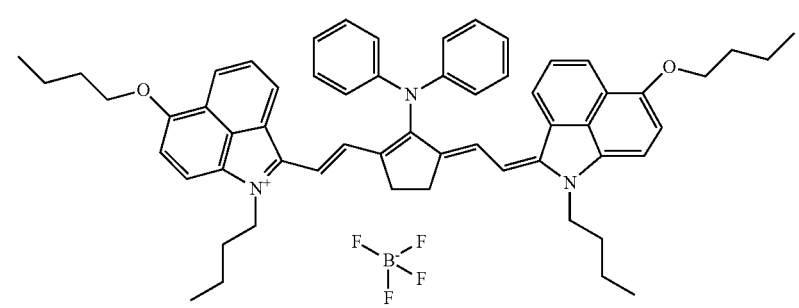 [SMILES: CCCCOc1ccc2c3c(cccc13)C(/C=C/C1=C(N(c3ccccc3)c3ccccc3)C(=C/C=c3\c4cccc5c(OCCCC)ccc(c54)n3CCCC)/CC1)=[N+]2CCCC ; F[B-](F)(F)F] | 1087** | −0.26 | −0.32 |
| D7 (COMP) | 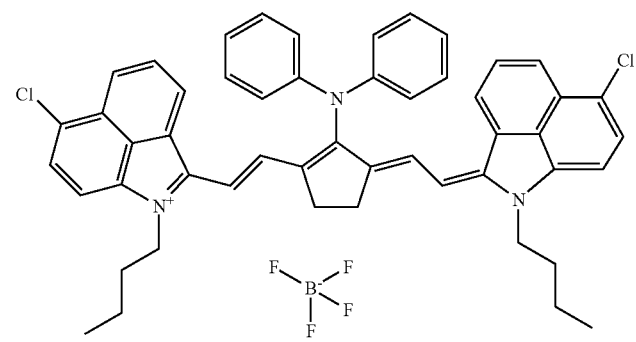 [SMILES: CCCCn1/c(=C/C=C2\CCC(/C=C/C3=[N+](CCCC)c4ccc(Cl)c5cccc3c45)=C2N(c2ccccc2)c2ccccc2)c2cccc3c(Cl)ccc1c32 ; F[B-](F)(F)F] | 1030** | −0.26 | 0.227 |

TABLE 1-continued

| Compound | Structure | λ_max (nm) | σ_p (R3)* | σ_p (R1) = σ_p (R2)* |
|---|---|---|---|---|
| D8 (COMP) | | 1076** | −0.08 | −0.32 |
| D9 (COMP) | | 1059** | 0.227 | 0.227 |
| D10 (COMP) | | 909*** | −0.65 | —H |
| D11 (COMP) | | 1095**** | 0.227 | 0.07 |

*As described in the following references:

J. E. Leffler and E. Grunwald, Rates and Equilibria of Organic Reactions, Wiley, 1963; Chem. Rev. 1991, 97, 165-195; Theoretical and Experimental Chemistry, 1966, 2, 347-351; Tetrahedron, 1969, 25, 5623-5637; Angew. Chem. Int. Ed. 7 (1968), 544-545.

**Measured in methylene chloride, as specified in the product catalogue of Spectrum Info ltd. (http://www.spectrum.kiev.ua/catalogue/)

***The absorption maxima were determined by absorption spectroscopy using a standard spectrophotometer capable of measuring the absorption between 300 and 1500 nm. Here a SHIMADZU UV-2101 PC spectrophotometer was used to measure the absorption maxima of an infrared dye dissolved in methylene chloride including $6.5 \times 10^{-6}$ wt % of methanesulfonic acid based on the total weight of methylene chloride.

****as specified in DE4331162.

The data of Table 1 illustrate that an absorption maxima (λmax) above 1130 nm is only observed for IR dyes which combine $\sigma_p$ for R3 above 0.4 and $\sigma_p$ for R1 and R2 below 0.25 and that R1 and R2 are not hydrogen atoms.
The absorption maxima (λmax) of the prior art IR dyes D12 and D13 are given in Table 2.

TABLE 3-continued

| wt % of components | SUB-1 |
|---|---|
| DOW-sol | 1.33 |
| Surfynsol | 1.33 |

TABLE 2

| Compound | Structure | Source | $\lambda_{max}$ (nm)* |
|---|---|---|---|
| D12 | | Synthesis see above | 1078 nm |
| D13 | | Synthesis see above | 1024 nm |

*The absorption maxima were determined by absorption spectroscopy using a standard spectrophotometer capable of measuring the absorption between 300 and 1500 nm. Here a SHIMADZU UV-2101 PC spectrophotometer was used to measure the absorption maxima of an infrared dye dissolved in methylene chloride including $6.5 \times 10^{-6}$ wt % of methanesulfonic acid based on the total weight of methylene chloride.

From Table 2 it is clear that D12 and D13 have an absorption maximum well below 1130 nm.

3-Colour Card

This example illustrates the use of an IR dye according to a preferred embodiment of the present invention in a colour laser marking security document precursor.

Preparation of PET-C Foils PET1 and PET2

A coating composition SUB-1 was prepared by mixing the components according to Table 3 using a dissolver.

TABLE 3

| wt % of components | SUB-1 |
|---|---|
| deionized water | 76.66 |
| CCE | 18.45 |
| Resorcinol | 0.98 |
| PAR-sol | 0.57 |
| PEA-sol | 0.68 |

A 1100 μm thick polyethylene terephthalate sheet was first longitudinally stretched and then coated on one side with the coating composition SUB-1 to a wet thickness of 10 μm. After drying, the longitudinally stretched and coated polyethylene terephthalate sheet was transversally stretched to produce a singlewide subbed 63 μm thick sheet PET1, which was transparent and glossy.

A 1100 μm thick polyethylene terephthalate sheet was first longitudinally stretched and then coated on both sides with the coating composition SUB-1 to a wet thickness of 10 μm. After drying, the longitudinally stretched and coated polyethylene terephthalate sheet was transversally stretched to produce a double side subbed 63 μm thick sheet PET2, which was transparent and glossy.

Preparation of Laser Markable Inner Laminate IL1

The coating compositions BCOL1 and YCOL1 were prepared in the same way by mixing the components according to Table 4 using a dissolver.

TABLE 4

| wt % of components | BCOL1 | YCOL1 |
|---|---|---|
| MEK | 16.87 | 4.11 |
| SolvinSol | 60.00 | — |
| VinSol | — | 75.00 |
| D15 | 20.00 | — |
| D1 | — | 18.22 |
| HDP | 1.63 | 1.63 |
| BLD | 1.50 | — |
| YLD | — | 1.04 |

The coating composition BCOL1 was coated with an Elcometer Bird Film Applicator (from ELCOMETER INSTRUMENTS) on one side of the PET-C support PET2 at a coating thickness of 100 μm and subsequently dried for 2 minutes at 20° C. on the film applicator and for a further 15 minutes in an oven at 75° C.

Then the coating composition YCOL1 was coated with an Elcometer Bird Film Applicator (from ELCOMETER INSTRUMENTS) on the opposite side of the PET-C support PET2 coated with BCOL1 at a coating thickness of 100 μm and subsequently dried for 2 minutes at 20° C. on the film applicator and for a further 15 minutes in an oven at 75° C. to deliver the laser markable inner laminate IL1.

Preparation of Laser Markable Outer Laminate OL1

The coating composition MCOL1 was prepared by mixing the components according to Table 5 using a dissolver.

TABLE 5

| wt % of components | MCOL1 |
|---|---|
| SolvinSol | 53.65 |
| IR-3 | 40.77 |
| HDP | 2.13 |
| MLD | 3.45 |

The coating composition MCOL1 was coated with an Elcometer Bird Film Applicator (from ELCOMETER INSTRUMENTS) on the subbed side of the PET-C support PET1 at a coating thickness of 100 μm and subsequently dried for 2 minutes at 20° C. on the film applicator and for a further 15 minutes in an oven at 75° C. to deliver the laser markable outer laminate OL1.

Preparation of Laser Markable Article LMA1

An assembly was made of, in order, a white opaque core support CORE, the laser markable inner laminate IL1, a 35 μm PETG TR foil, and the laser markable outer laminate OL1, wherein the side coated with YCOL1 of the laser markable inner laminate IL1 faces the white opaque core support CORE, and wherein the side coated with MCOL1 of the outer laminate OL1 faces the white opaque core support.

The assembly was then laminated into a laser markable article LMA1 using an Oasys™ OLA6/7 plate laminator with the settings: LPT=130° C., LP=40, Hold=210 sec, HPT=130° C., HP=40 and ECT=50° C.

Evaluation and Results

The laser markable article LMA1 was then laser marked with three infrared lasers of different emission wavelength. The optical density was measured in reflection using a spectrodensitometer Type GretagMacbeth SPM50 using a visual filter.

A first optically pumped semiconductor laser emitting at 920 nm (Genesis MX 920-4000 MTM from COHERENT) was used for producing a magenta coloured wedge of 0.6 cm×0.6 cm square boxes of increasing optical density up to a maximum optical density of 2.75 in the laser markable layer coated from MCOL1. The laser was used at a power level of 1.63 W, a dither of 0.025, a scan speed of 100 mm/s and at a pulse repetition rate of 1.2 kHz.

A second optically pumped semiconductor laser emitting at 1064 nm (Genesis MX 1064-10000 MTM from COHERENT) was used for producing a blue coloured wedge of 0.6 cm×0.6 cm square boxes of increasing optical density up to a maximum optical density of 1.32 in the laser markable layer coated from BCOL1. The laser was used at a power level of 2.82 W (21.8 A), a dither of 0.025, a scan speed of 100 mm/s and at a pulse repetition rate of 1.2 kHz.

A third optically pumped semiconductor laser emitting at 1150 nm (Genesis MX 1150-6000 MTM from COHERENT) was used for producing a yellow coloured wedge of 0.6 cm×0.6 cm square boxes of increasing optical density up to a maximum optical density of 1.35 in the laser markable layer coated from YCOL1. The laser was used at a power level of 4.3 W, a dither of 0.025, a scan speed of 100 mm/s and at a pulse repetition rate of 1.2 kHz.

No colour contamination was observed in the different coloured wedges. This means that none of the three lasers caused any colour formation in a laser markable layer other than the one for which it was intended. For example, the 920 nm laser caused no blue respectively yellow colour formation in the laser markable layers coated from BCOL1 and YCOL1.

A combination of two different optically pumped semiconductor lasers at different wavelengths (920 nm, 1064 nm or 1150 nm, lasers and exposing parameters as described here above) was used for producing mix colours. Yellow+blue results in green coloured wedges with a maximum density of 1.55. Yellow+magenta results in red coloured wedges with a maximum density of 2.53.

1-Color Cards

The colour laser markable articles LMA-2 to LMA-5 were obtained by coating the components as defined in Table 6, dissolved in MEK, onto the subbed site of the PET1 foil described above. The coating solutions were applied at a wet coating thickness of 90 μm and dried at 50° C. for 5 minutes in a circulation oven.

TABLE 6

| Components | amount/m² |
|---|---|
| S-Lec BX35Z | 6.50 g |
| IR dye - See Table 7 | 0.05 mmol |
| CLD | 4.10 mmol |
| AG | 5.00 mmol |
| HALS | 0.048 g |
| Tego Glide 410 | 2.00 mg |

The coated PET1 foils were then laminated onto the 500 μm opaque PETG core from WOLFEN, wherein the side coated with LMA-2 to LMA-5 of the coated PET1 foils faces the white opaque core, to deliver the Laser Markable Articles LMA-2 to LMA-5 of Table 7.

The lamination was performed using a Photonex-325 LSI laminator at a temperature of 130° C. and speed mode 1. After lamination, the optical density of the Laser Markable Articles were measured ($OD_{MIN}$). Then, a test image of 0.6 cm×0.6 cm was laser marked by a optically pumped semiconductor laser emitting at 1150 nm (Genesis MX 1150-6000 MTM from COHERENT). The laser was used at a power level of 4.3 W, a dither of 0.025, a scan speed of 100 mm/s and at a pulse repetition rate of 1.2 kHz. The optical density was measured within the laser-marked area ($OD_{LM}$). $OD_{MIN}$ and $OD_{LM}$ are listed in Table 7.

TABLE 7

|  | IR-absorber | OD$_{MIN}$ | OD$_{LM}$ |
| --- | --- | --- | --- |
| LMA-2 (INV) | D1 | 0.24 | 2.00 |
| LMA-3 (COMP) | D2 | 0.23 | 0.23 |
| LMA-4 (COMP) | D12 | 0.20 | 0.20 |
| LMA-5 (COMP) | D13 | 0.19 | 0.19 |

As it can be observed from the results in Table 7 that only the Laser Markable Articles comprising the inventive IR-absorber result in a sufficiently high OD$_{LM}$.

The invention claimed is:
1. An infrared dye comprising:
a chemical structure according to Formula I:

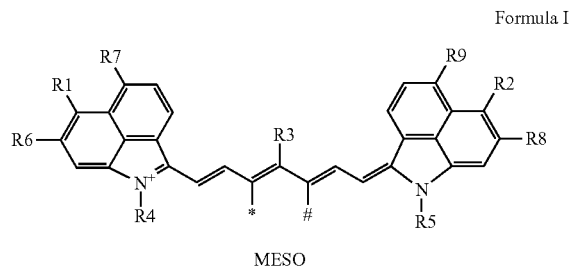

Formula I wherein
MESO is selected from the group consisting of MESO-A, MESO-B, and MESO-C;

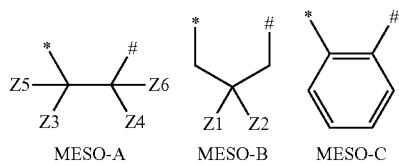

and * indicate points of attachment of MESO-A, MESO-B, and MESO-C in Formula I;
R1 and R2 each independently represent a substituent with a Hammett constant for para substituents ($\sigma_p$) below 0.25 with the proviso that R1 and R2 are not hydrogen atoms;
R3 represents a substituent with $\sigma_p$ above 0.4;
R6, R7, R8, and R9 represent hydrogen; or
  R6 and R1 together, or R7 and R1 together, represent necessary atoms to form an optionally substituted five- or six-membered ring including an oxygen or nitrogen atom directly attached to the carbon atom carrying the R1 group;
  R8 and R2 together, or R9 and R2 together, represent necessary atoms to form an optionally substituted five- or six-membered ring including an oxygen or nitrogen atom directly attached to the carbon atom carrying the R2 group;
R4 and R5 each independently represent an optionally substituted alkyl group;
Z1, Z2, Z3, Z4, Z5, and Z6 each independently represent hydrogen, an alkyl group having 1 to 8 carbon atoms, a cyanide group, an ester group having 2 to 8 carbon atoms, an amide group having 3 to 8 carbon atoms, or an aryl group having 6 to 14 carbon atoms; or Z1 and Z2 represent necessary atoms to form an alicyclic group having 5 to 14 carbon atoms or a heterocyclic group having 4 to 14 carbon atoms.
2. The infrared dye according to claim 1, wherein R1 and R2 each independently represent a substituent with a Hammett constant for para substituents ($\sigma_p$) below −0.1.
3. The infrared dye according to claim 1, wherein R1 and R2 each independently represent a chlorine atom, a bromine atom, an iodide atom, an alkoxide group, a thioalkyl group, an arylamino group, or an alkylamino group.
4. The infrared dye according to claim 1, wherein R1 and R2 represent an alkoxide group having 1 to 10 carbon atoms.
5. The infrared dye according to claim 1, wherein R3 represents a substituent with a Hammett constant for para substituents above 0.65.
6. The infrared dye according to claim 1, wherein R3 represents an optionally substituted sulfonium group, an optionally substituted ammonium group, an optionally substituted fosfonium group, an optionally substituted phosphine group, —CN, NO$_2$, —SOCF$_3$, —N$_2^+$, —SO$_2$CF$_3$, —SO$_2$CN, —COCF$_3$, —C(CN)$_3$, —OSO$_2$CF$_3$, SCF$_3$, —OCN, —SCN, OSO$_2$CF$_3$, —SO$_2$—Y1, or —PY2Y3; and
  Y1, Y2, and Y3 each independently represent an optionally substituted alkyl or aryl group.
7. The infrared dye according to claim 1, wherein R3 represents —SO$_2$—Y4, and Y4 represents an optionally substituted alkyl or aryl group.
8. The infrared dye according to claim 1, wherein the infrared dye has a maximum absorption ($\lambda$max)≥1130 nm.
9. A laser markable material comprising:
  a laser markable layer as a self-supporting layer or as a layer on a support;
  the laser markable layer includes the infrared dye as defined in claim 1.
10. The laser markable material according to claim 9, wherein the laser markable layer is provided on a transparent biaxially stretched polyester support.
11. A laser markable article comprising:
  a core support; and
  the laser markable material according to claim 10; wherein
  the laser markable layer is located between the core support and the transparent biaxially stretched polyester support.
12. The laser markable article according to claim 11, wherein the laser markable article is selected from the group consisting of a passport, a personal identification card, and a product identification document.
13. The laser markable material according to claim 9, wherein the laser markable layer further includes a leuco-dye.
14. The laser markable material according to claim 9, further comprising a second laser markable layer and a third laser markable layer; wherein
  the infrared dye in the laser markable layer corresponds to a first infrared dye IR-1 having an absorption maximum in the infrared region $\lambda_{max}$(IR-1);
  the second laser markable layer includes a second infrared dye IR-2 having an absorption maximum in the infrared region $\lambda_{max}$(IR-2);
  the third laser markable layer includes a third infrared dye IR-3 having an absorption maximum in the infrared region $\lambda_{max}$(IR-3);
  each of the laser markable layers includes a leuco-dye; and $\lambda_{max}(IR\text{-}1) > \lambda_{max}(IR\text{-}2) > \lambda_{max}(IR\text{-}3)$.

15. A method for preparing a laser marked article using three infrared lasers L-1, L-2, and L-3 having, respectively, laser emission wavelengths of $\lambda(L-1)$, $\lambda(L-2)$ and $\lambda(L-3)$, the method comprising the steps of:

laser marking with the infrared laser L-1 a first laser markable layer including an infrared dye IR-1 having an absorption maximum in the infrared region $\lambda_{max}(IR-1)$;

laser marking with the infrared laser L-2 a second laser markable layer including an infrared dye IR-2 having an absorption maximum in the infrared region $\lambda_{max}(IR-2)$;

laser marking with the infrared laser L-3 a third laser markable layer including an infrared dye IR-3 having an absorption maximum in the infrared region $\lambda_{max}(IR-3)$; wherein the laser emission wavelengths satisfy the condition of:

$\lambda(L-1) > \lambda(L-2) > \lambda(L-3)$;

the infrared red dye absorption maxima satisfy the condition of:

$\lambda_{max}(IR-1) > \lambda_{max}(IR-2) > \lambda_{max}(IR-3)$; and

IR-1 is the infrared dye as defined in claim 1.

\* \* \* \* \*